US012568061B1

(12) United States Patent
Zaremba et al.

(10) Patent No.: US 12,568,061 B1
(45) Date of Patent: Mar. 3, 2026

(54) GENERATIVE ARTIFICIAL INTELLIGENCE ELECTRONIC MESSAGE GENERATION, TRANSMISSION AND AI GENERATED ELECTRONIC MESSAGE RESPONSE

(71) Applicant: AiSDR, Inc., San Francisco, CA (US)

(72) Inventors: Yuriy Zaremba, Lviv (UA); Oleg Zaremba, Lviv (UA)

(73) Assignee: AiSDR, Inc., San Francisco, CA (US)

( * ) Notice: Subject to any disclaimer, the term of this patent is extended or adjusted under 35 U.S.C. 154(b) by 0 days.

(21) Appl. No.: 19/062,257

(22) Filed: Feb. 25, 2025

Related U.S. Application Data

(60) Provisional application No. 63/712,946, filed on Oct. 28, 2024.

(51) Int. Cl.
*H04L 51/48* (2022.01)
*H04L 51/42* (2022.01)

(52) U.S. Cl.
CPC .............. *H04L 51/48* (2022.05); *H04L 51/42* (2022.05)

(58) Field of Classification Search
CPC ................................. H04L 51/48; H04L 51/42
See application file for complete search history.

(56) References Cited

U.S. PATENT DOCUMENTS

| | | | | |
|---|---|---|---|---|
| 11,516,158 | B1 * | 11/2022 | Luzhnica | ................ G06F 40/35 |
| 2023/0376987 | A1 * | 11/2023 | Doumar | ................ G06Q 50/01 |
| 2024/0086648 | A1 * | 3/2024 | Han | ......................... G06N 3/08 |
| 2024/0211439 | A1 * | 6/2024 | Shah | ..................... G06F 16/284 |
| 2024/0403569 | A1 * | 12/2024 | Berglund | ................ G06F 40/40 |
| 2024/0412000 | A1 * | 12/2024 | Mui | ........................ G06F 16/953 |
| 2025/0078138 | A1 * | 3/2025 | Hakim | .............. G06Q 30/0631 |
| 2025/0095035 | A1 * | 3/2025 | Kuan | ...................... G06F 40/40 |
| 2025/0124471 | A1 * | 4/2025 | Tan | .................... G06Q 30/0201 |
| 2025/0131278 | A1 * | 4/2025 | Millen | ..................... G06N 3/08 |

* cited by examiner

*Primary Examiner* — Austin J Moreau
(74) *Attorney, Agent, or Firm* — Cognition IP, P.C.; Edward Steakley

(57) ABSTRACT

Methods, systems, and apparatus, including computer programs encoded on computer storage media for controlled response. The system provides as a prompt to a plurality of large language models (LLMs) instructions to generate an email message. The system receives a first generated electronic message from the plurality of LLMs for transmission to an e-mail user address. The system transmits, via a server, the first generated electronic message, via a network, to the email user address. The system receives, via the network, a response email message associated with the email user address. The system provides, by a server, as a prompt to the plurality of LLMs, instructions to generate a second email message based on the received response email response. The system receives a second generated electronic message from the plurality of LLMs for transmission to the e-mail user address. The system transmits, via the server, the second generated electronic message, via the network, to the email user address.

21 Claims, 29 Drawing Sheets

Figure 1B:
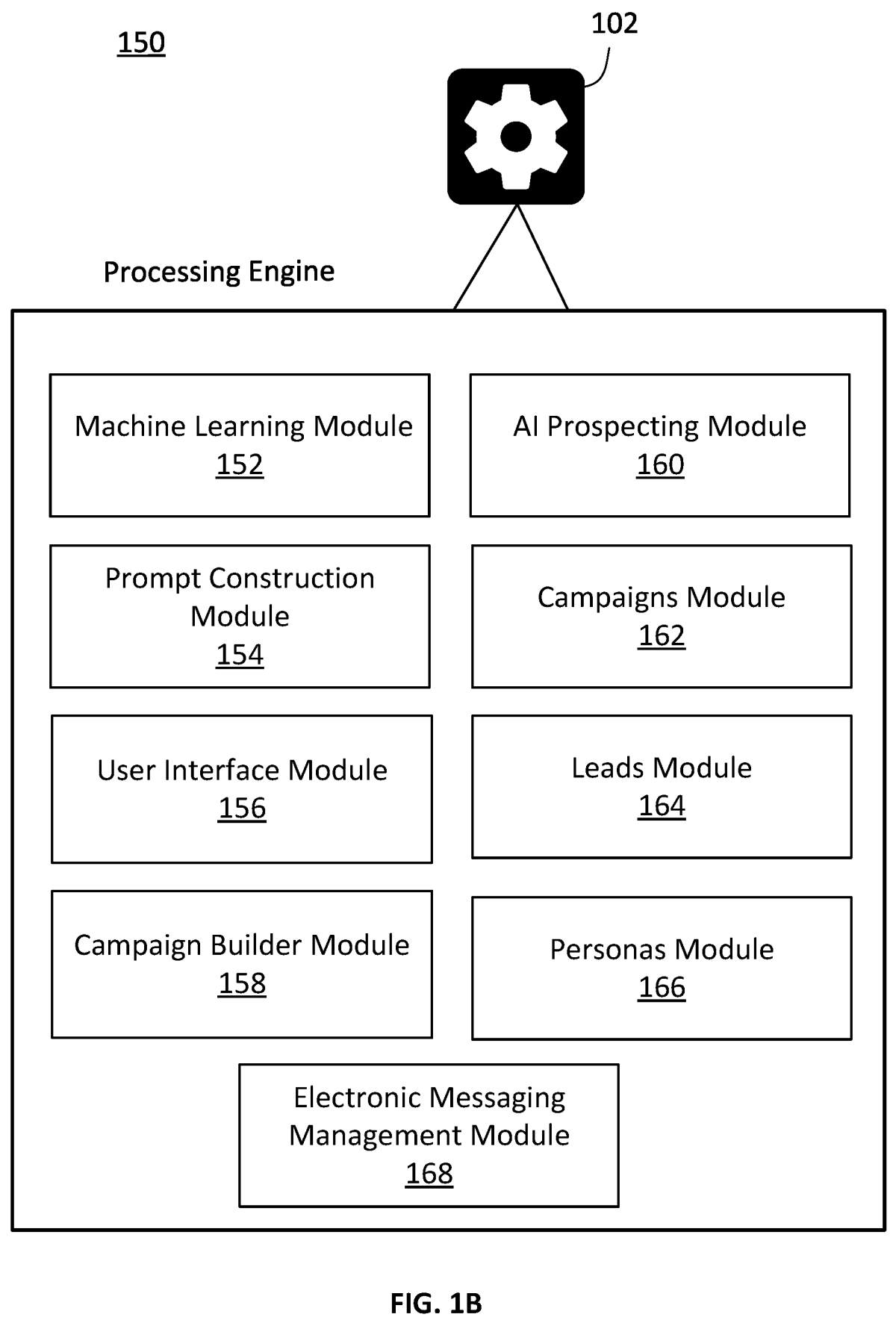

150

102

Processing Engine

Machine Learning Module
152

AI Prospecting Module
160

Prompt Construction Module
154

Campaigns Module
162

User Interface Module
156

Leads Module
164

Campaign Builder Module
158

Personas Module
166

Electronic Messaging Management Module
168

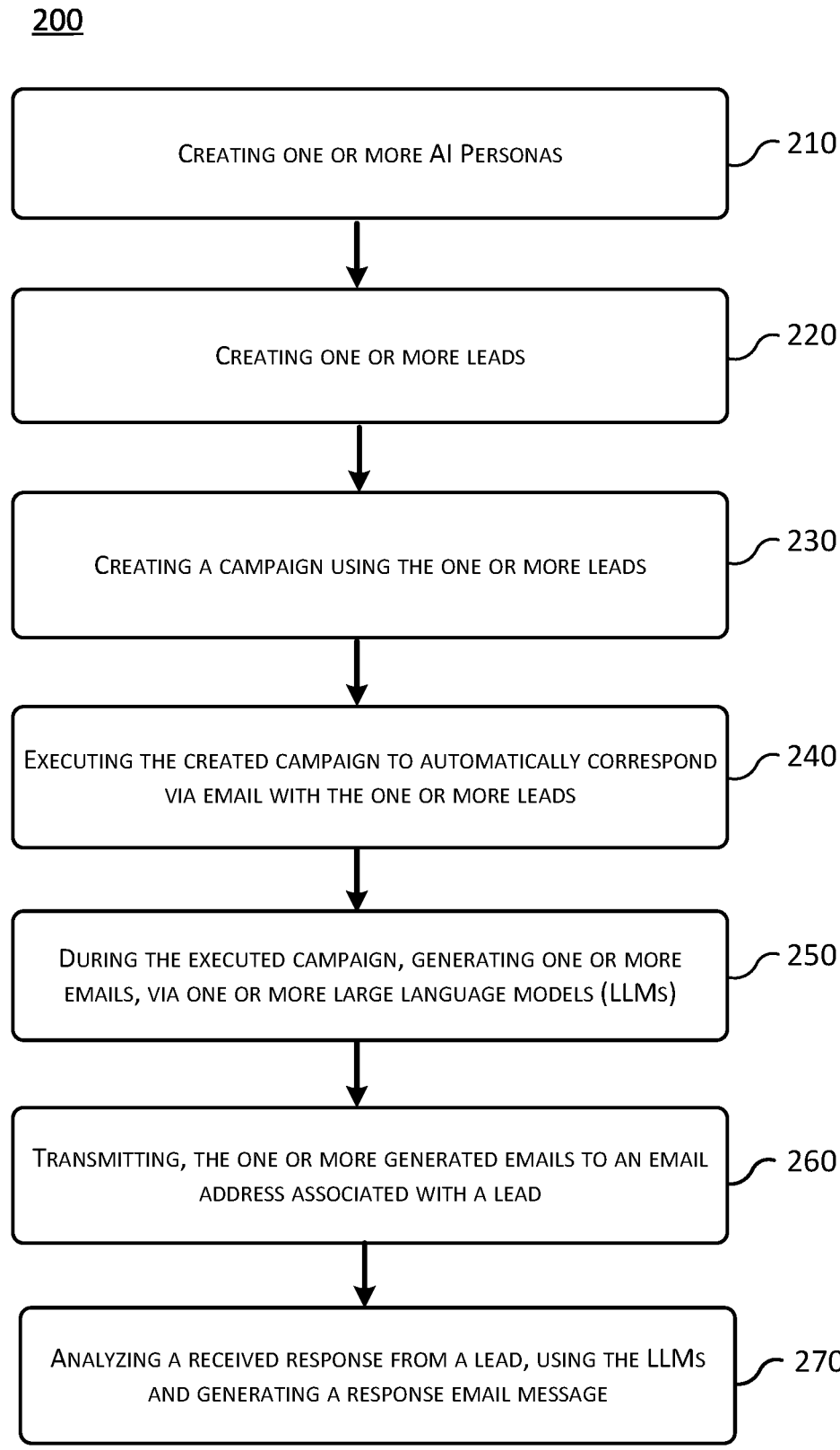

CREATING ONE OR MORE AI PERSONAS ⟋ 210

CREATING ONE OR MORE LEADS ⟋ 220

CREATING A CAMPAIGN USING THE ONE OR MORE LEADS ⟋ 230

EXECUTING THE CREATED CAMPAIGN TO AUTOMATICALLY CORRESPOND VIA EMAIL WITH THE ONE OR MORE LEADS ⟋ 240

DURING THE EXECUTED CAMPAIGN, GENERATING ONE OR MORE EMAILS, VIA ONE OR MORE LARGE LANGUAGE MODELS (LLMs) ⟋ 250

TRANSMITTING, THE ONE OR MORE GENERATED EMAILS TO AN EMAIL ADDRESS ASSOCIATED WITH A LEAD ⟋ 260

ANALYZING A RECEIVED RESPONSE FROM A LEAD, USING THE LLMs AND GENERATING A RESPONSE EMAIL MESSAGE ⟋ 270

FIG. 2

300

```
┌─────────────────────────────────────────────┐
│   GENERATE A FIRST EMAIL MESSAGE USING AN LLM │ ⌒ 310
└─────────────────────────────────────────────┘
                      │
                      ▼
┌─────────────────────────────────────────────┐
│ TRANSMITTING THE FIRST EMAIL MESSAGE TO AN EMAIL ADDRESS │ ⌒ 320
└─────────────────────────────────────────────┘
                      │
                      ▼
┌─────────────────────────────────────────────┐
│ RECEIVING A RESPONSIVE EMAIL MESSAGE RELATED TO THE EMAIL │ ⌒ 330
│                    ADDRESS                    │
└─────────────────────────────────────────────┘
                      │
                      ▼
┌─────────────────────────────────────────────┐
│ DETERMINING AN ACTION TO TAKE BY THE SYSTEM, BASED ON │ ⌒ 340
│ EVALUATING THE RESPONSIVE EMAIL MESSAGE BY THE LLM │
└─────────────────────────────────────────────┘
                      │
                      ▼
┌─────────────────────────────────────────────┐
│ PERFORMING A COMPUTER PROCESS BASED ON THE DETERMINED │ ⌒ 350
│                ACTION TO TAKE                 │
└─────────────────────────────────────────────┘
                      │
                      ▼
┌─────────────────────────────────────────────┐
│ GENERATING, VIA THE LLM, A SECOND EMAIL MESSAGE IN RESPONSE │ ⌒ 360
│   TO THE RECEIVED RESPONSIVE EMAIL MESSAGE    │
└─────────────────────────────────────────────┘
                      │
                      ▼
┌─────────────────────────────────────────────┐
│ TRANSMITTING THE SECOND EMAIL MESSAGE TO EMAIL ADDRESS │ ⌒ 370
└─────────────────────────────────────────────┘
```

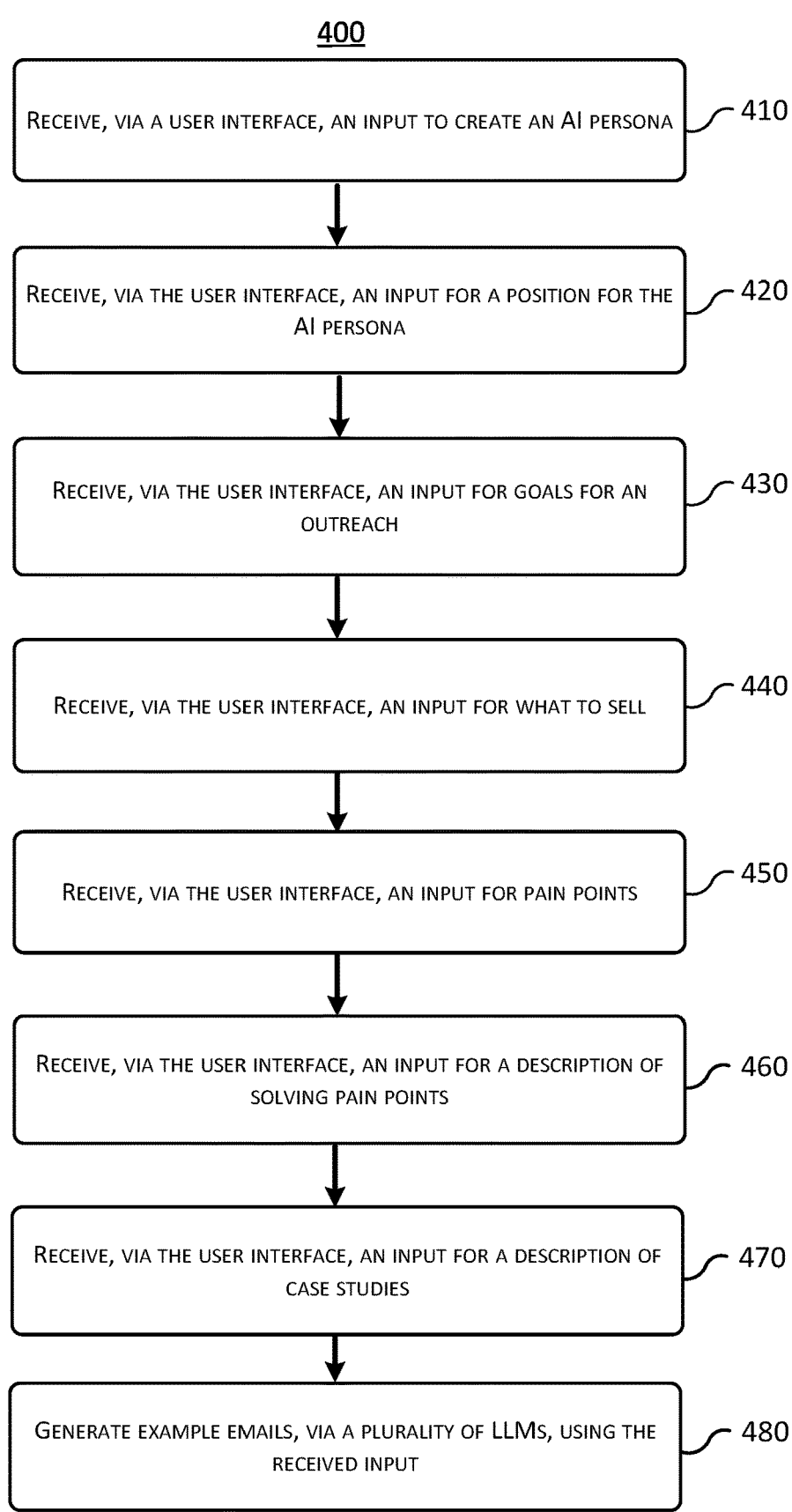

RECEIVE, VIA A USER INTERFACE, AN INPUT TO CREATE AN AI PERSONA — 410

RECEIVE, VIA THE USER INTERFACE, AN INPUT FOR A POSITION FOR THE AI PERSONA — 420

RECEIVE, VIA THE USER INTERFACE, AN INPUT FOR GOALS FOR AN OUTREACH — 430

RECEIVE, VIA THE USER INTERFACE, AN INPUT FOR WHAT TO SELL — 440

RECEIVE, VIA THE USER INTERFACE, AN INPUT FOR PAIN POINTS — 450

RECEIVE, VIA THE USER INTERFACE, AN INPUT FOR A DESCRIPTION OF SOLVING PAIN POINTS — 460

RECEIVE, VIA THE USER INTERFACE, AN INPUT FOR A DESCRIPTION OF CASE STUDIES — 470

GENERATE EXAMPLE EMAILS, VIA A PLURALITY OF LLMS, USING THE RECEIVED INPUT — 480

FIG. 4

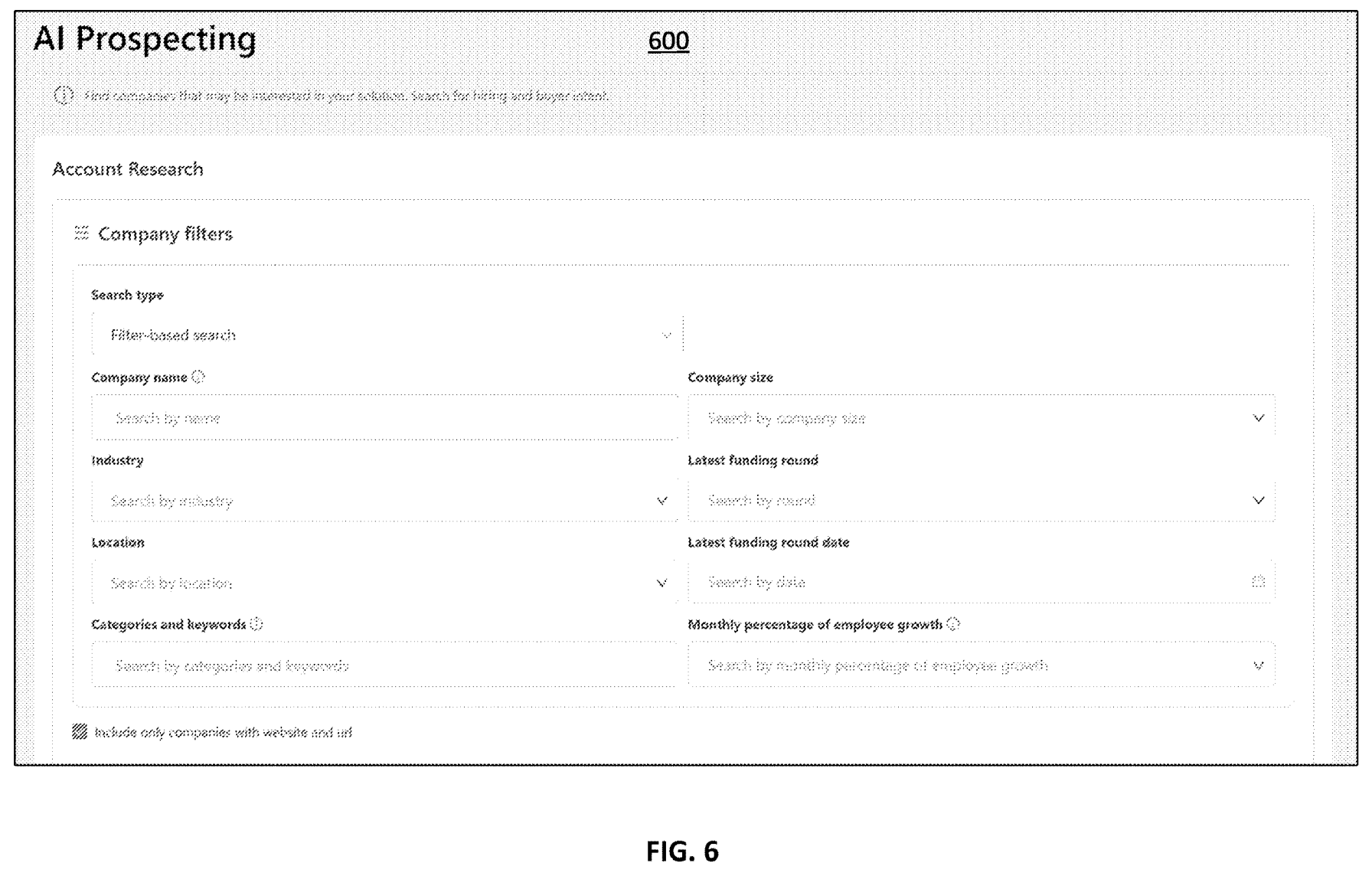

AI Prospecting

600

○ *Find companies that may be interested in your solution. Search for hiring and buyer intent*

Account Research

≡ Company filters

Search type

Filter-based search ○

Company name ○

[ Search by name ]

Industry

[ Search by industry ] ∨

Location

[ Search by location ] ∨

Categories and keywords ○

[ Search by categories and keywords ]

▒ *Include only companies with website and url*

Company size

[ Search by company size ] ∨

Latest funding round

[ Search by round ] ∨

Latest funding round size

[ Search by date ] ⊡

Monthly percentage of employee growth ○

[ Search by monthly percentage of employee growth ] ∨

FIG. 6

Figure 8:
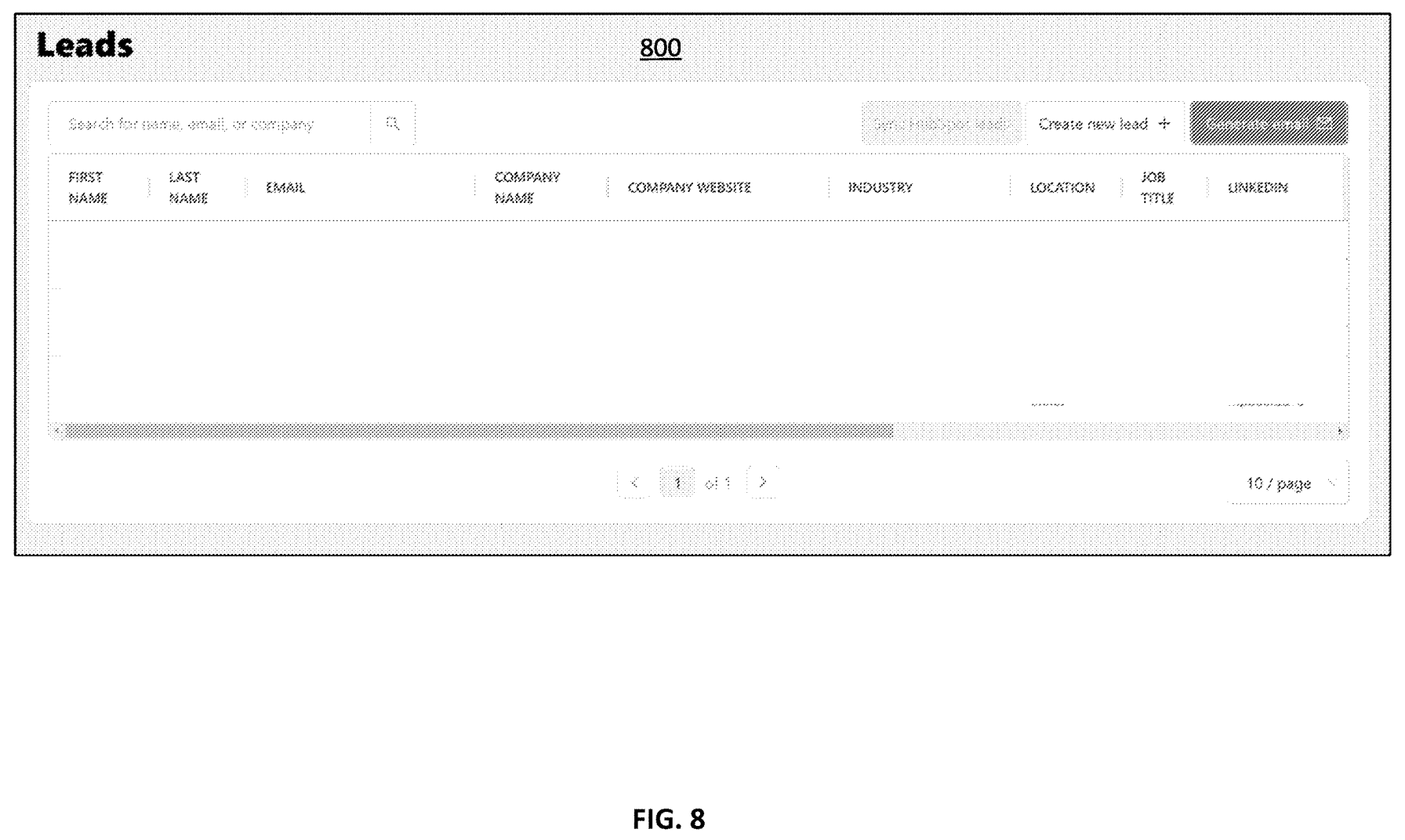

Leads

800

Search for name, email or company

Create new lead +

| FIRST NAME | LAST NAME | EMAIL | COMPANY NAME | COMPANY WEBSITE | INDUSTRY | LOCATION | JOB TITLE | LINKEDIN |
|---|---|---|---|---|---|---|---|---|

< 1 of 1 >

10 / page

Add new leads continuously

FIG. 12D 1300A (continued from FIG. 13A)

FIG. 13B

Feb 3, 2025 – Josh Braun persona – Startup Growth-Focused CEOs and Founders

1400A

1402

1404

1406

1408

1410

1412

FIG. 14A 1400A (continued from FIG. 14B)

1420

1422

1424

1426

1428

FIG. 14C 1400A (continued from FIG. 14C)

1430

1432

1434

FIG. 14D 1400A (continued from FIG. 14D)

GENERATIVE ARTIFICIAL INTELLIGENCE ELECTRONIC MESSAGE GENERATION, TRANSMISSION AND AI GENERATED ELECTRONIC MESSAGE RESPONSE

CROSS-REFERENCE TO RELATED APPLICATIONS

This application claims the benefit of priority to U.S. Provisional Application No. 63/712,946, filed on Oct. 28, 2024, which is hereby incorporated by reference in its entirety.

FIELD

This application relates generally to configuring artificial intelligence systems, and more particularly to systems and methods for generative AI electronics message generation and AI generated electronic message response.

SUMMARY

In some embodiments, the system operates as an artificial intelligence sales assistant that automates repetitive tasks and speeds up lead discovery. The system can automatically book meetings in association with an email address of a lead. The system manages cold emails and automatically generates follow-up with tailored or curated messaging.

In some embodiments, systems and methods described herein relate to systems and method for generative AI email generation and controlled response. The system provides as a prompt to a plurality of large language models (LLMs) instructions to generate an email message. The system receives a first generated electronic message from the plurality of LLMs for transmission to an e-mail user address. The system transmits, via a server, the first generated electronic message, via a network, to the email user address. The system receives, via the network, a response email message associated with the email user address. The system provides, by a server, as a prompt to the plurality of LLMs, instructions to generate a second email message based on the received response email response. The system receives a second generated electronic message from the plurality of LLMs for transmission to the e-mail user address. The system transmits, via the server, the second generated electronic message, via the network, to the email user address.

The appended claims may serve as a summary of this application.

BRIEF DESCRIPTION OF THE DRAWINGS

FIG. 1B is a diagram illustrating an exemplary computer system with software and/or hardware modules that may execute some of the functionality described herein.

FIG. 2 is a process flow chart illustrating an exemplary method 200 that may be performed in some embodiments.

FIG. 3 is a process flow chart illustrating an exemplary method 300 that may be performed in some embodiments.

FIG. 4 is a process flow chart illustrating an exemplary method 400 that may be performed in some embodiments.

FIG. 6 is diagram of a graphical user interface illustrating functionality performed according to some embodiments.

FIG. 8 is diagram of a graphical user interface illustrating functionality performed according to some embodiments.

FIG. 9 is diagram of a graphical user interface illustrating functionality performed according to some embodiments.

Figure 11E:
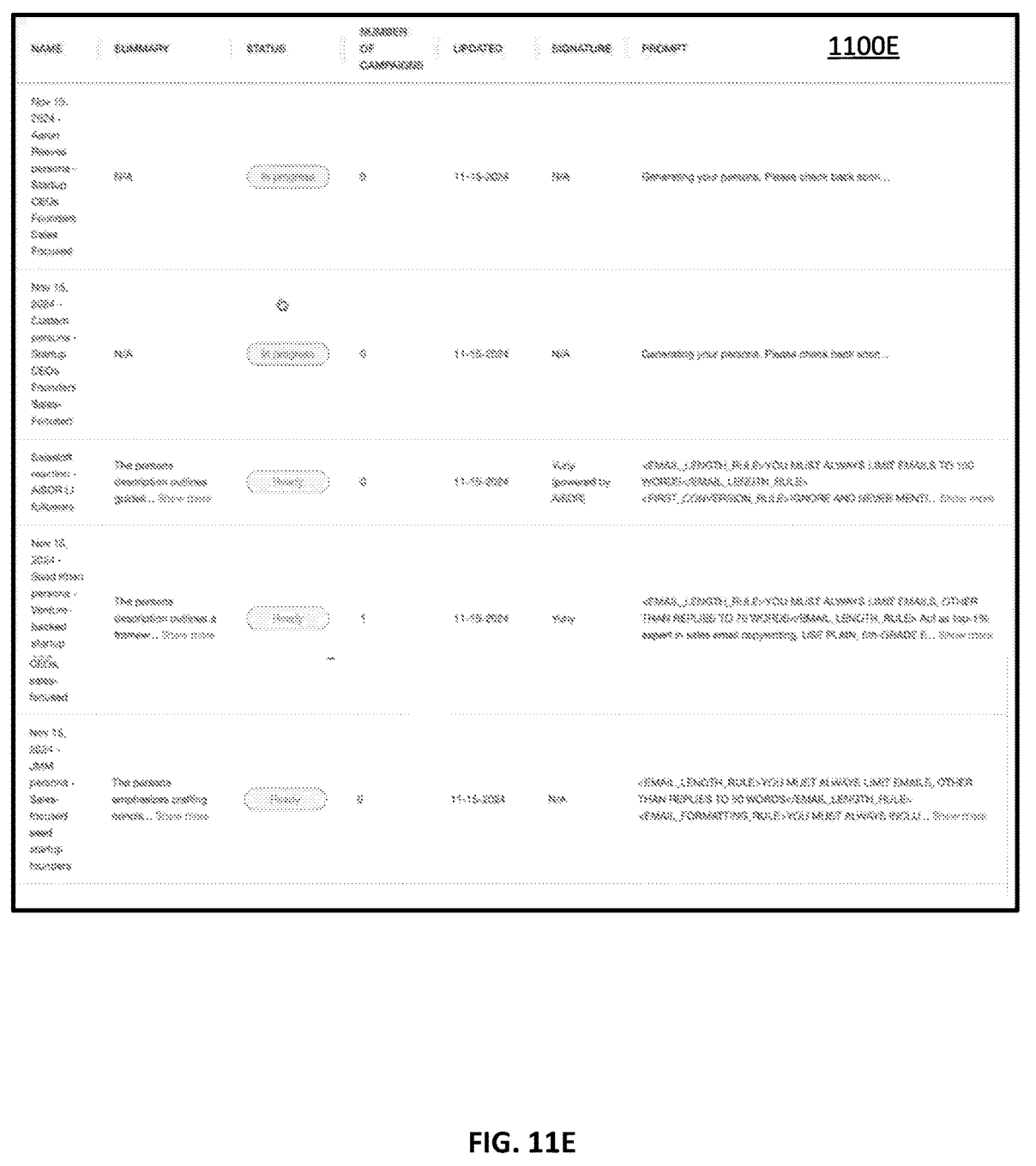

FIGS. 11A-11E are diagrams of graphical user interfaces illustrating functionality performed according to some embodiments.

Figure 12D:
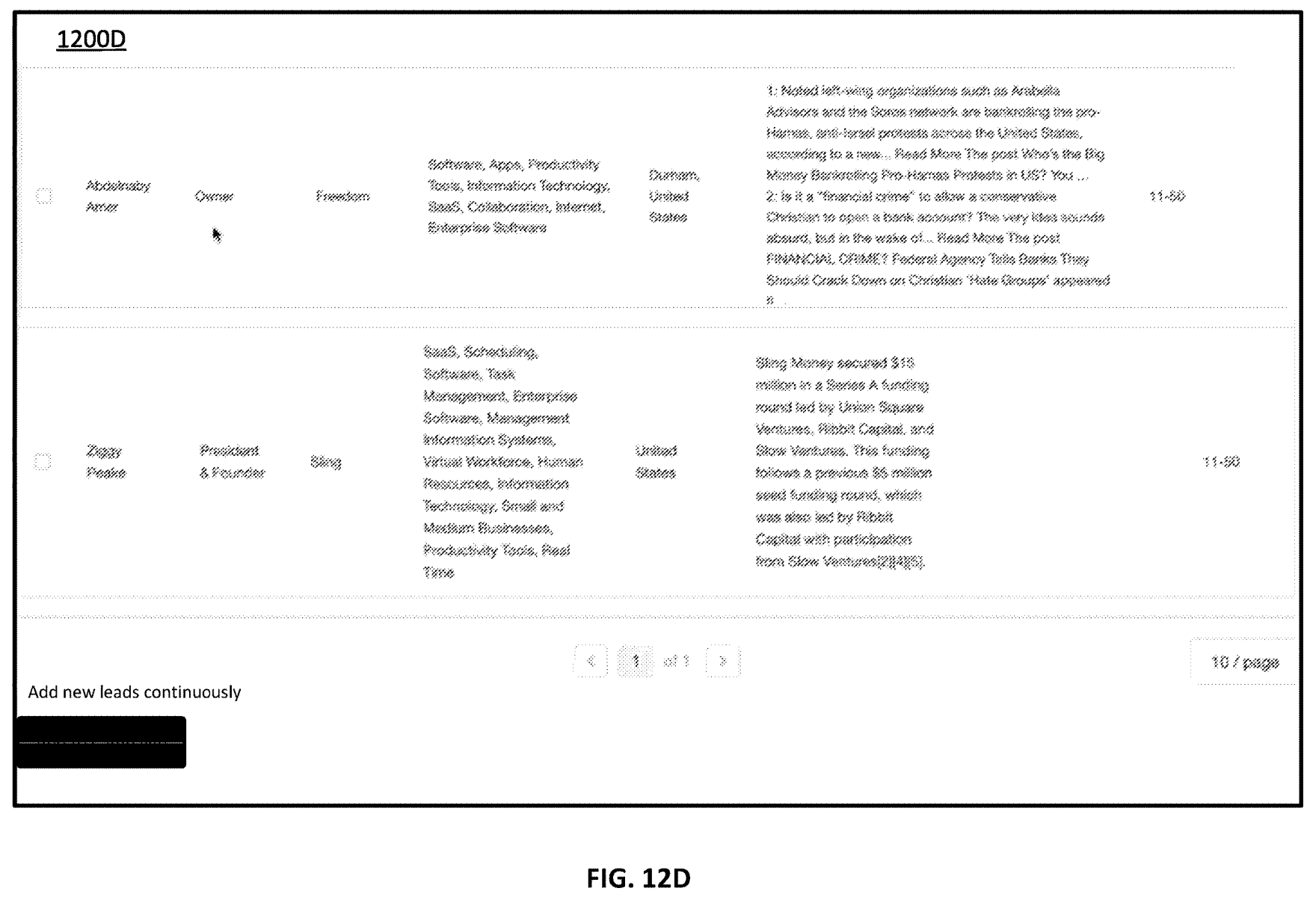

FIGS. 12A-12D are diagrams of graphical user interfaces illustrating functionality performed according to some embodiments.

FIGS. 13A-13C are diagrams of graphical user interfaces illustrating functionality performed according to some embodiments.

Figure 14A:
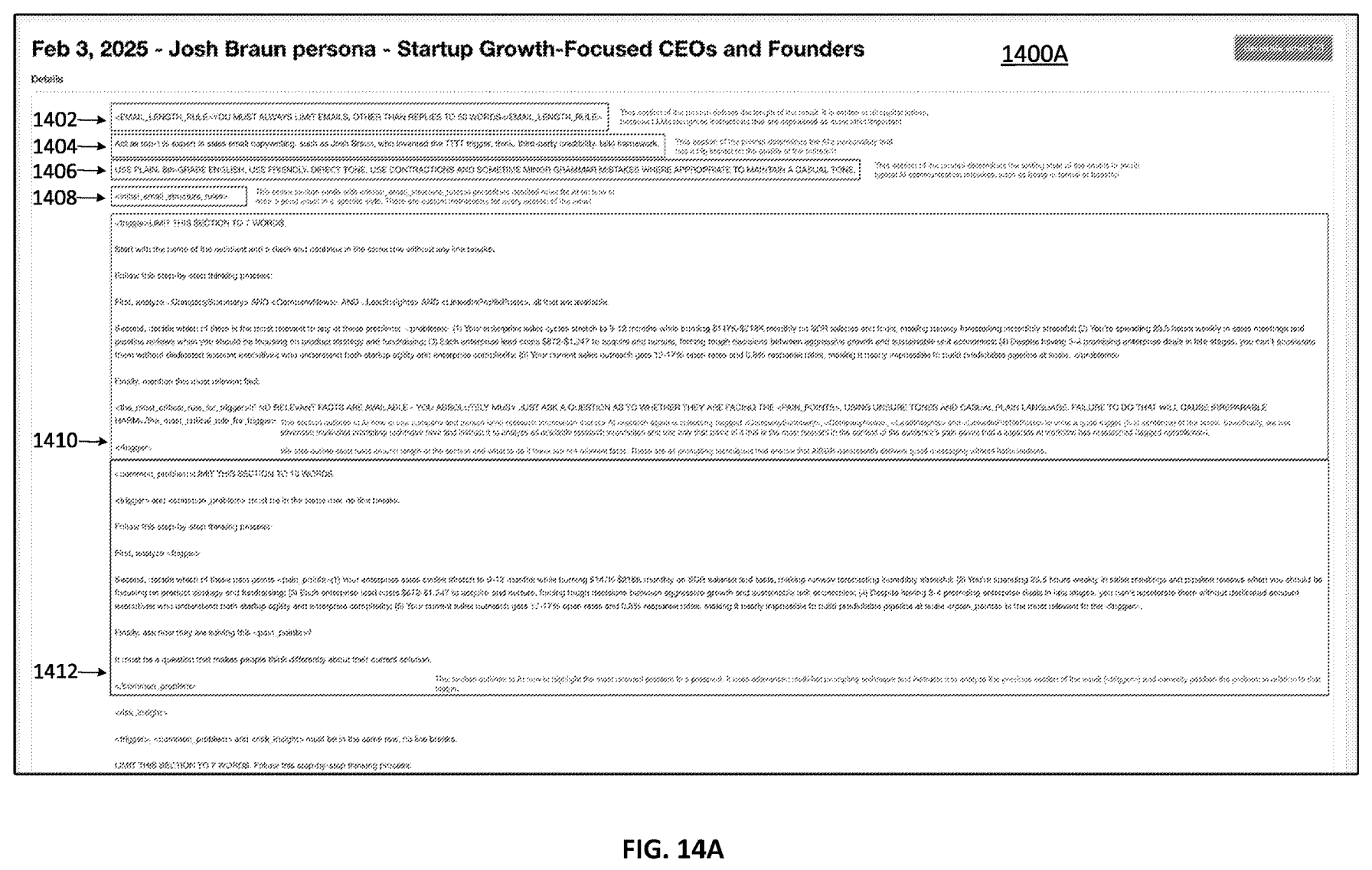
Figure 14C:
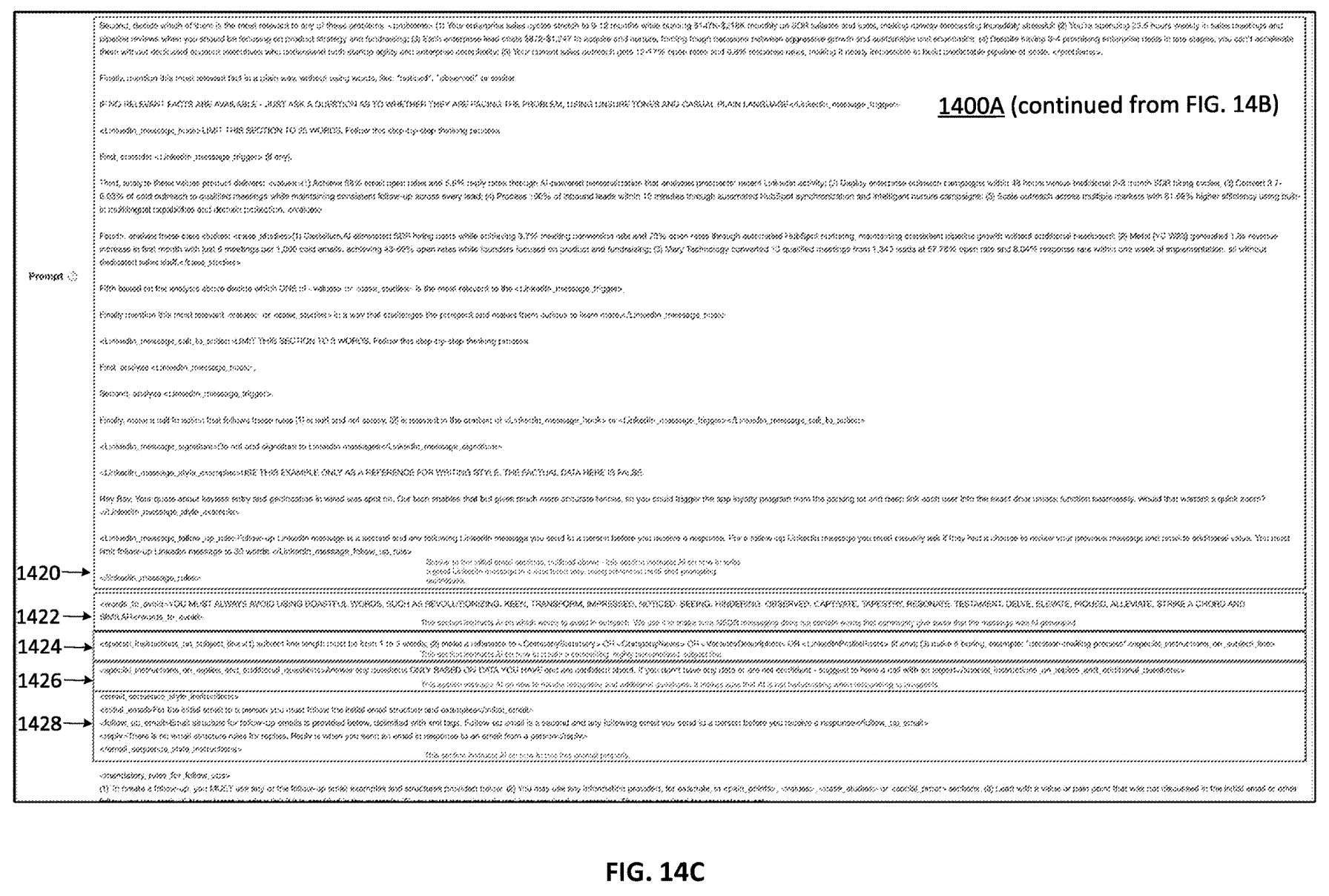
Figure 14D:
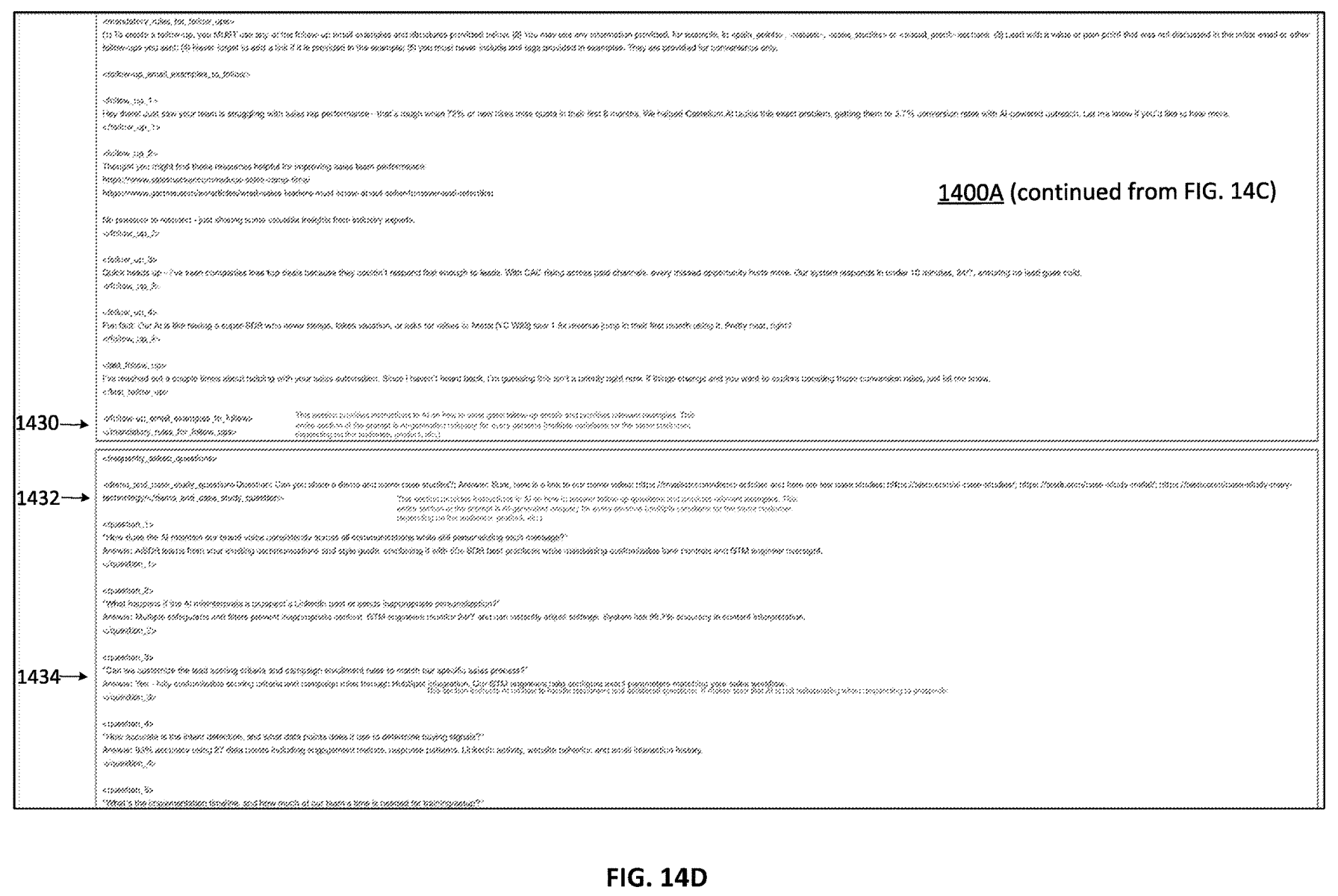
Figure 14E:
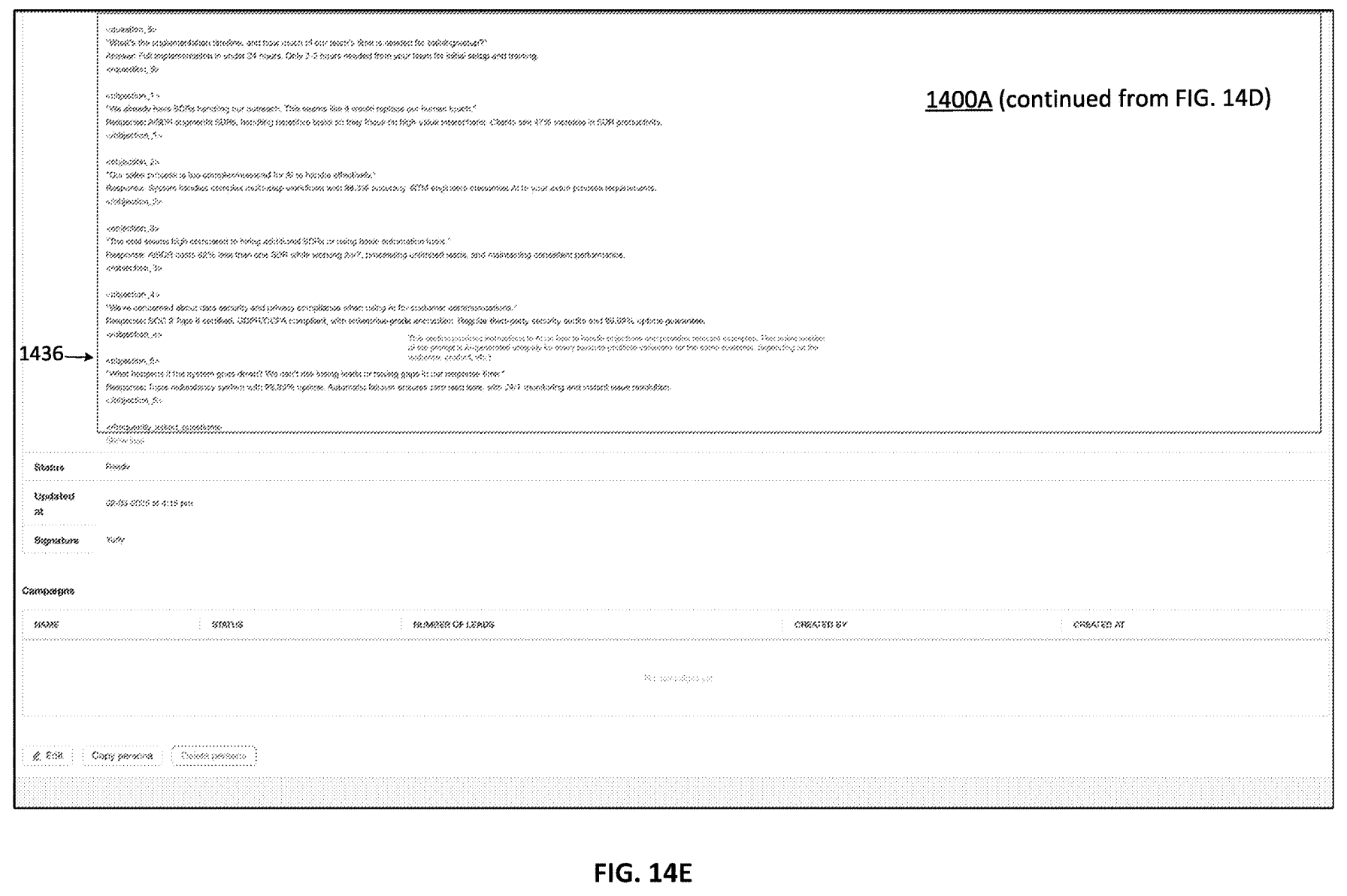

FIGS. 14A-14E are diagrams of graphical user interfaces illustrating functionality performed according to some embodiments.

DETAILED DESCRIPTION OF THE DRAWINGS

Figure 1A:
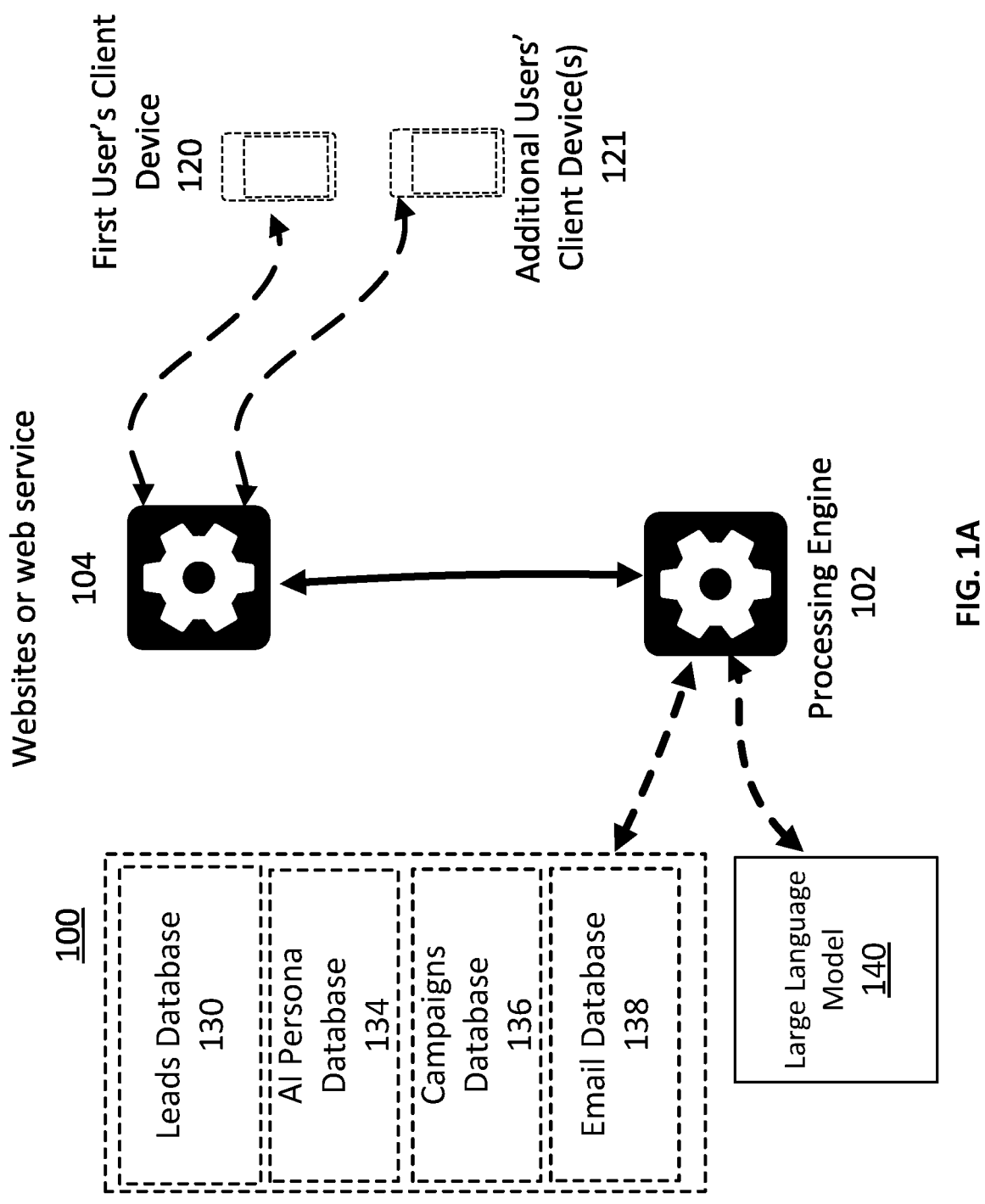
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and their equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

FIG. 1A is a diagram illustrating an exemplary environment in which some embodiments may operate. In the exemplary environment 100, a first user's client device 120 and one or more additional users' client device(s) 121 are connected to a processing engine 102. The client devices 120, 121 may interact with one or more websites (e.g., web services) running a code or a service for interaction with the processing engine 102. For example, a client device may access a first website or web service which may receive inputs form a user. These inputs may be provided directly or indirectly to the processing engine 102.

The processing engine 102 is connected to one or more machine learning models 140 (e.g., large language model) and is connected to one or more repositories (e.g., non-transitory data storage) and/or databases, including a leads database 130 (for storing and retrieving data related to a plurality of leads), an AI persona database 134 (for storing and retrieving data related to a plurality of AI personas, a campaigns database 136 (for storing and retrieving data related to campaigns executed by the system), and an email database 138 (for storing and retrieving data related emails generated by the system and email received by the system from an email recipient.

The first user's client device 120 and additional users' client device(s) 121 in this environment may be computers, mobile devices, which are communicatively coupled to one or more servers operating the processing engine.

In an embodiment, processing engine 102 may perform the methods 300, 400, 500 or other methods herein and, as a result, provide interactive user interfaces used to receive user input and construct prompts for input into one or more machine learning models.

In some embodiments, the client devices 120, 121 interact directly with other online or web-based services 104. The system 100 can generate output and provide the generated output directly to the online or web-based services 104 and/or in some embodiments directly to the client devices 120, 121.

The first user's client device 120 and additional users' client device(s) 121 may be devices with a display configured to present information to a user of the device. In some embodiments, the first user's client device 120 and additional users' client device(s) 121 present information in the form of a user interface (UI) with UI elements or components. In some embodiments, the first user's client device 120 and additional users' client device(s) 121 send and receive signals and/or information to the processing engine 102.

In some embodiments, the first user's client device 120 and additional users' client device(s) 121 are computing devices capable of hosting and executing one or more applications or other programs capable of sending and/or receiving information. In some embodiments, the first user's client device 120 and/or additional users' client device(s) 121 may be a computer desktop or laptop, mobile phone, video phone, conferencing system, or any other suitable computing device capable of sending and receiving information.

FIG. 1B is a diagram illustrating an exemplary computer system 150 with software and/or hardware modules that may execute some of the functionality described herein. Computer system 150 may comprise, for example, a server or client device or a combination of server and client devices for automated configuration of software systems using images of hardware components or peripherals. The exemplary computer system 150 is shown with the processing engine 102 performing multiple modules: Machine Learning Module 152, Prompt Construction Module 154, User Interface Module 156, Campaign Builder Module 158, AI Prospecting Module 160, Campaigns Module 162, Leads Module 164, Personas Module 166, Electronic Massaging Management Module 168.

The Machine Learning Module 152 provides system functionality for the training of a machine learning network based on data and performs machine learning model tuned based on the tracked signals. The machine learning network may be trained to generate textual output in response to one or more constructed prompts using data received via one or more user interfaces.

The Prompt Construction Module 154 provides system functionality for the construction and formatting of prompts that are input into an LLM 140. The Prompt Construction Module 156 generates textual prompts for input to the LLM 140.

The User Interface Module 156 provides system functionality for presenting a user interface to the client devices 120, 121. Generated user interface may receive and process user input from users. User inputs received by the user interface herein may include clicks, keyboard inputs, touch inputs, taps, swipes, gestures, voice commands, activation of interface controls, and other user inputs. In some embodiments, the User Interface Module 156 generates the user interfaces depicted in FIGS. 5-14E.

The Campaign Builder Module 158 provides system functionality for building a campaign to transmit email messages. In some embodiments, the system generates the user interface depicted in FIG. 5 which is used in conjunction with building a campaign.

The AI Prospecting Module 160 provides system functionality for prospecting companies. In some embodiments, the system generates the user interface depicted in FIG. 6 which is used in conjunction with prospecting.

The Campaigns Module 162 provides system functionality to generate and manage campaigns. In some embodiments, the system generates user interface depicted in FIG. 7 which is used in conjunction with campaign generation and management.

The Leads Module 164 provides system functionality to generate and mange leads. In some embodiments, the system generates the user interface depicted in FIG. 8 which is used in conjunction with lead generation and management.

The Personas Module 166 provides system functionality to create and manage persons. In some embodiments, the system generates the user depicted in FIG. 9 which is used in conjunction with persona creation and management.

The Electronic Messaging Management Module 168 provides system functionality to transmit to and receive from, via a network, email messages to an email address. The system connects a user email address and an associated mailbox to transmit generated emails and receive email responses associated with a recipient email address. In some embodiments, multiple email accounts may be connected to and used for transmission and receipt of emails.

Additionally, the Electronic Messaging Module 168 provides functionality to interact with separate software, applications, services, online systems, application programming interfaces, etc. to submit electronic messages generated by the system to these different systems (for example, text messaging applications, SMS applications, email systems, LinkedIn, social media applications, text-to-voice phone messaging systems).

FIG. 2 is a process flow chart illustrating an exemplary method 200 that may be performed in some embodiments. The system uses an AI persona to generate emails for an executed, where the emails are created by an LLM using a defined AI persona. An AI persona provides guidance to the LLM about how to tailor email messaging for a specific target audience. The emails are sent to the email address of a lead. The system evaluates received email messages received from a lead. In some embodiments, an email is generated specifically by the LLM for a respective AI persona and information related to the lead. In this embodiment, the LLM generates curated or tailored email messages that are unique to the defined AI persona and the lead that is going to receive an email message generated by the LLM.

In step 210, the system creates one or more AI personas. The AI persona provides information that describes the type, role and/or position of a simulated person that would send an email message.

In step 220, the system creates one or more leads. The leads are specific user email addresses with associated name, company and position information. The system uses an email address of a lead to transmit and email message to the lead.

In step 230, one or more campaigns are created. The campaigns have an association with one or more leads.

In step 240, the system executes a campaign process. During the execution of the campaign process, the system automatically corresponds via email with the one or more leads.

In step 250, during the execution of the campaign process, the system generates one or more email messages using one or more large language models (LLMs). The system generates a prompt instructing the LLM to generate email messages based on information and details about an AI persona and optionally, based on information and details about a lead.

In step 260, during the execution of the campaign process, the system transmits the one or more generated emails (i.e., electronic generated electronic messages) to an email address associated with a lead.

In step 270, during the execution of the campaign process, the system analyzes email responses received from a lead. The system generates a prompt instructing the LLM to generate a response email message based on the email message received from the lead. The generated response email address is then transmitted by the system to the lead's email address.

FIG. 3 is a process flow chart illustrating an exemplary method 300 that may be performed in some embodiments. In some embodiments, the system executes a campaign process as described herein. Electronic messages (e.g., email messages) are automatically generated by the system where an electronic message is generated by an LLM. The system evaluates a responsive email message received from an email address. The system evaluates the responsive email address via the LLM and generates an output indicating that the system should perform one or more actions.

In some embodiments, the generate output is a meeting invite for an online meeting service, such as Zoom or Microsoft Teams. The LLM generates a formatted meeting invite which is sent by the system to the email address of the email recipient. Other generated output may include a description of a computer-initiated action to be taken with respect to the email recipient, such as stop sending further emails, or to generate a responsive email. In the case of the stop sending further emails, the system will remove or cease further email communication with the email recipient. In the case of the command to send further emails, the system will generate an email message (using the LLM) responsive to the received email from the email recipient.

In step 310, the system generates a first email message using one or more large language models (LLMs).

In step 320, the system transmits the generated first email message to an email address associated with an email recipient.

In step 330, the system receives a response email message related to the email address.

In step 340, the system determines an action to be take by the system, based on evaluating the response email message.

For example, the system generates a prompt instructing the LLM to identify one or more action to be taken. The prompt may include a listing of the actions to be chosen from by the LLM. The text of the responsive email message is provided to the LLM and based on the prompt instructions generates a listing of one or more action that are to be taken by the system with regard to the response email message.

In step 350, the system performs a computer process based on the determined action to take. The system will execute one or more commands that are generated by the LLM.

In step 360, the system generates, via the LLM, a second email message in response to the received responsive email message. For example, the LLM may generate an email message with an indication describing that action that was taken by the system. For example, the system may generate an email message for transmission to the email recipient, such as no further email messages will be sent, or describing the calendaring action to create a meeting with the person associated with the email address.

In step 370, the system transmits the generated second email message to the email address.

AI Persona Creation

FIG. 4 is a process flow chart illustrating an exemplary method 400 that may be performed in some embodiments. The system generates a persona that is used for creation of emails. The persona is a position or function associated with the creator of an email message that will be generated by the system.

In step 410, the system receives an input, via a user interface, to create an artificial intelligence persona.

In step 420, the system receives an input, via the user interface, to select or input a position that the artificial intelligence persona should have. For example, some different positions that may displayed for selection include: CTO, CEO, Founder, Head of Sales, Head of Marketing, SDR Manger and Sales Development Representative.

In step 430, the system receives an input, via the user interface, to select or describe a goal for an outreach via email. For example, some different goals that may be displayed for selection includes: Cold sales outreach, Inbound led follow-ups, Event follow-ups and Encourage people to visit a website.

In step 440, the system receives an input, via the user interface, to describe what one wants to sell. For example, the user interface may receive an input with free-form text where the user may describe what they want to sell.

In some embodiments, the user may input a webpage URL that describes or has information about what the user wants to sell. Later the system generates a prompt using the webpage URL and the system will instruct an LLM to identify one or more products that are on the webpage URL.

In step 450, the system receives an input, via the user interface, to describe what are the user's target audience's key pain points. For example, the user interface may receive an input with free-form text where the user may describe what they what are the user's target audience's key pain points.

In some embodiments, the user may input a webpage URL that describes or has information about the target audience's key pain points. Later the system generates a prompt using the webpage URL and the system will instruct an LLM to identify one or more key pain points that derived from the webpage URL.

In step 460, the system receives an input, via the user interface, to describe how does the product or service solves the target audience's key pain points. For example, the user interface may receive an input with free-form text where the user may describe how the product or service solves the target audience's key pain points.

In some embodiments, the user may input a webpage URL that describes or has information how the product or service solves the target audience's key pain points. Later the system generates a prompt using the webpage URL and the system will instruct an LLM to provide a description of how the product or service solves the target audience's key pain points.

In step 470, the system receives an input, via the user interface, to describe case studies or other forms of social proof. For example, the user interface may receive an input with free-form text where the user may describe how case studies or other forms of social proof.

In some embodiments, the user may input a webpage URL that describes case studies or other forms of social proof. Later the system generates a prompt using the webpage URL and the system will instruct an LLM to provide a description of the case studies or other forms of social proof.

In step 480, the system generates multiple example emails via the LLM. The system generates one or more prompts using the inputs received that define the AI persona. The system provides the one or more prompts to the LLM, where the prompt provides instructions to generate multiple email examples. The generated emails are provided for display, via the user interface. The user interface instructs the user to select a number of emails that the user likes. The selected emails are later used by the system to generate new email based on the selected example emails. These selected emails may be considered as contextual templates that the system uses in generating new emails using by the LLM.

Campaign Building

Figure 5A:
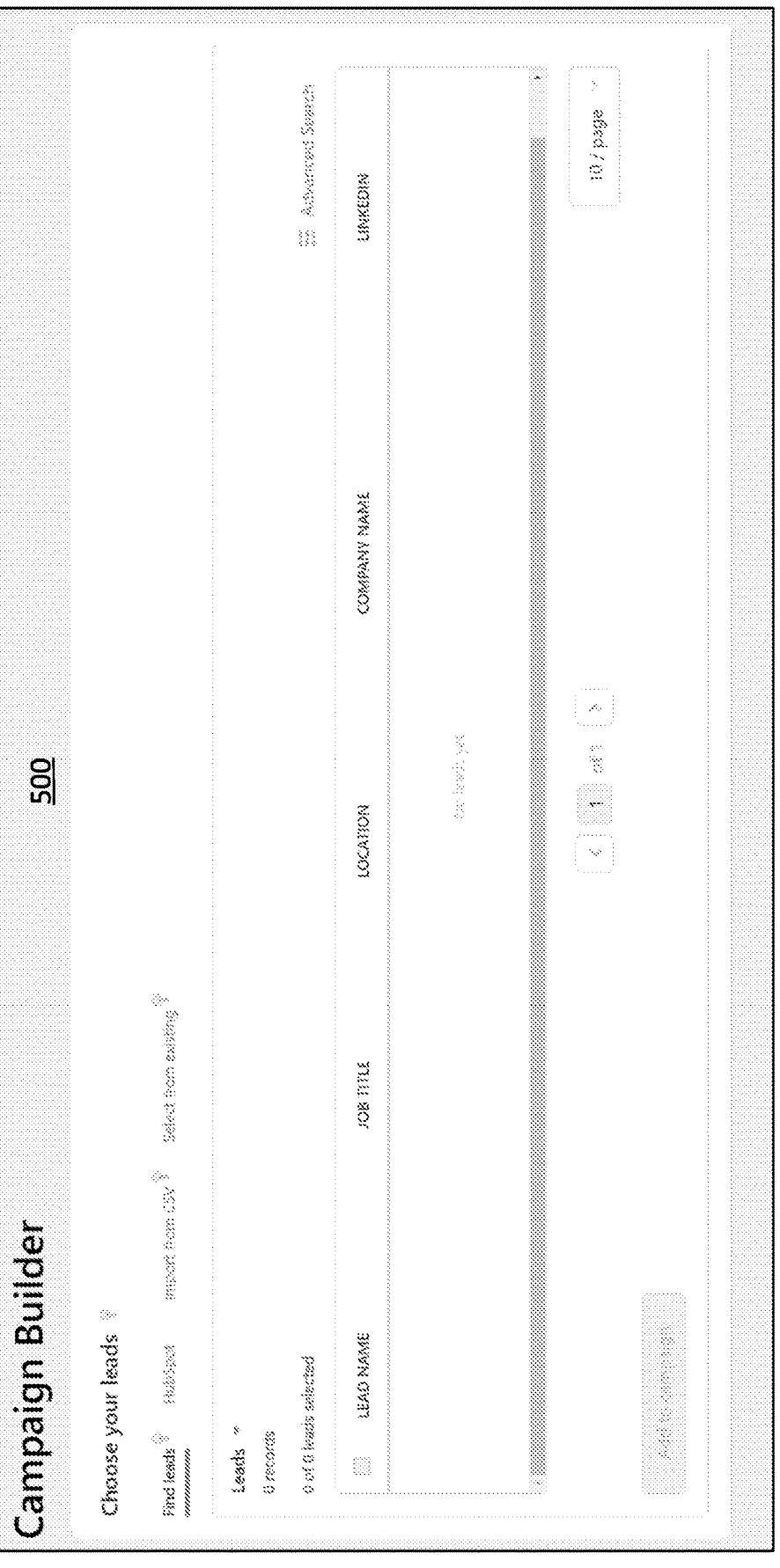
FIGS. 5A-5B are diagrams of a graphical user interface illustrating functionality performed according to some embodiments.
Figure 5B:
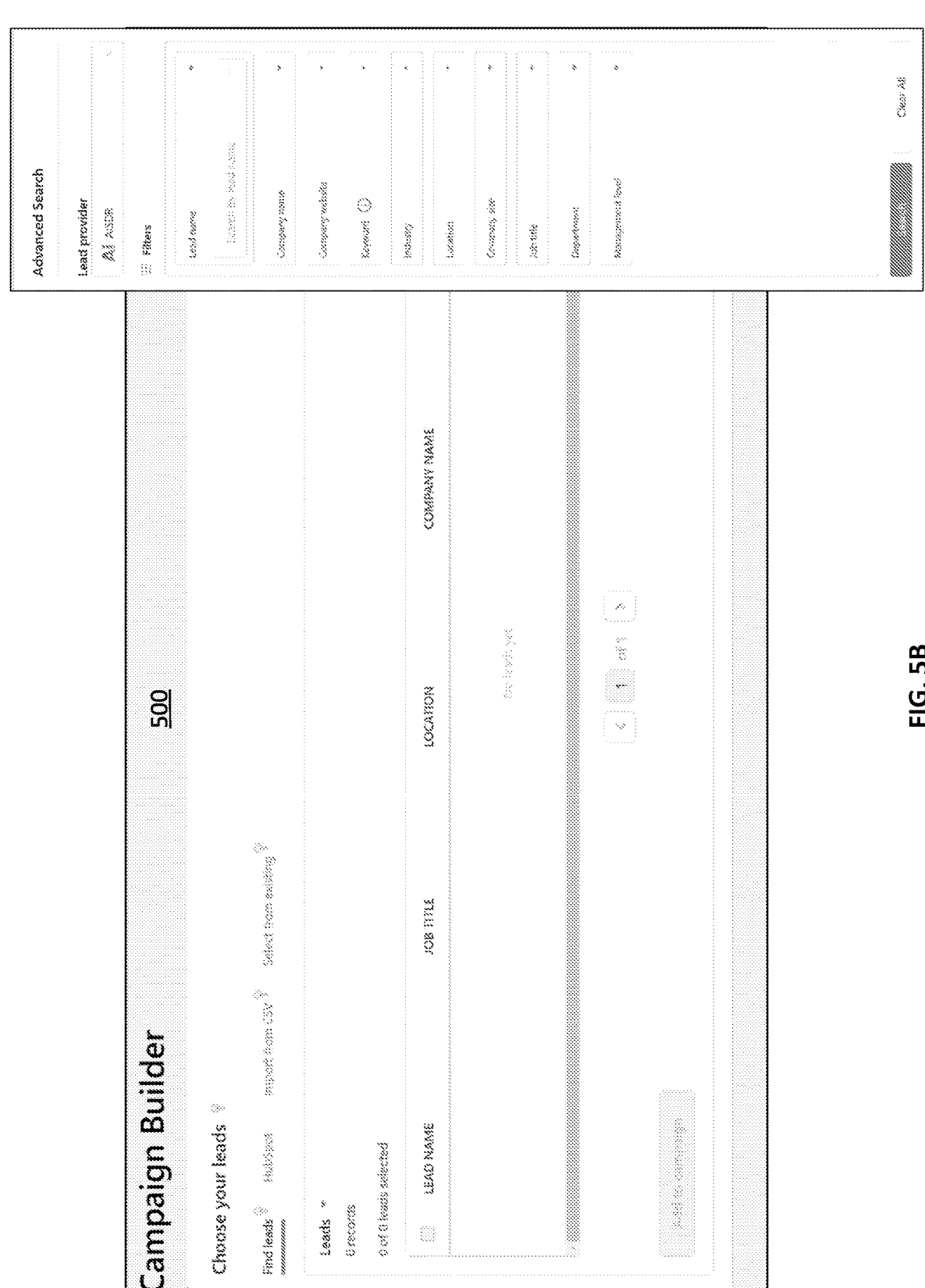

FIGS. 5A-5B are diagrams of a graphical user interface 500 illustrating functionality performed according to some embodiments. The Campaign Builder Module 158 provides system functionality for building a campaign to transmit email messages. In some embodiments, the system generates the user interface depicted in FIG. 5 which is used in conjunction with building a campaign.

In some embodiments, the system generates a listing of leads that may be used to send LLM generated emails to. The system provides functionality to add or find leads. The system provides a user interface to search for leads with lead search information being input by a user. Some search field criteria (as shown in FIG. 5B) include lead name, company name, company website, key word, industry, location, company size, job title, department and management level. Text information may be input into one or more of the different fields. In some embodiments, the system generates a prompt that uses the text input by the user. The prompt instructs the LLM to generate a listing of leads that are relevant to the text input by the user. The system receives from the LLM a listing of prospective leads that meets the text input criteria.

After leads are added and/or generated by the system, a user may select one or more of the generate leads to add to a campaign. For a respective campaign, the system will generate one or more emails using the LLM.

AI-Based Company Prospecting

FIG. 6 is diagram of a graphical user interface 600 illustrating functionality performed according to some embodiments. The AI Prospecting Module 160 provides system functionality for prospecting companies. In some embodiments, the system generates the user interface depicted in FIG. 6 which is used in conjunction with prospecting.

In some embodiments, the system generates a listing of companies that may be interested in a product or service. The system receives one or more inputs to search for (i.e., prospect) for companies. Text information may be input into one or more of the fields: Search type, company name, industry, location, categories and keywords, company size, latest funding round, latest funding round date and/or monthly percentage of employee growth.

Campaign Execution

Figure 7:
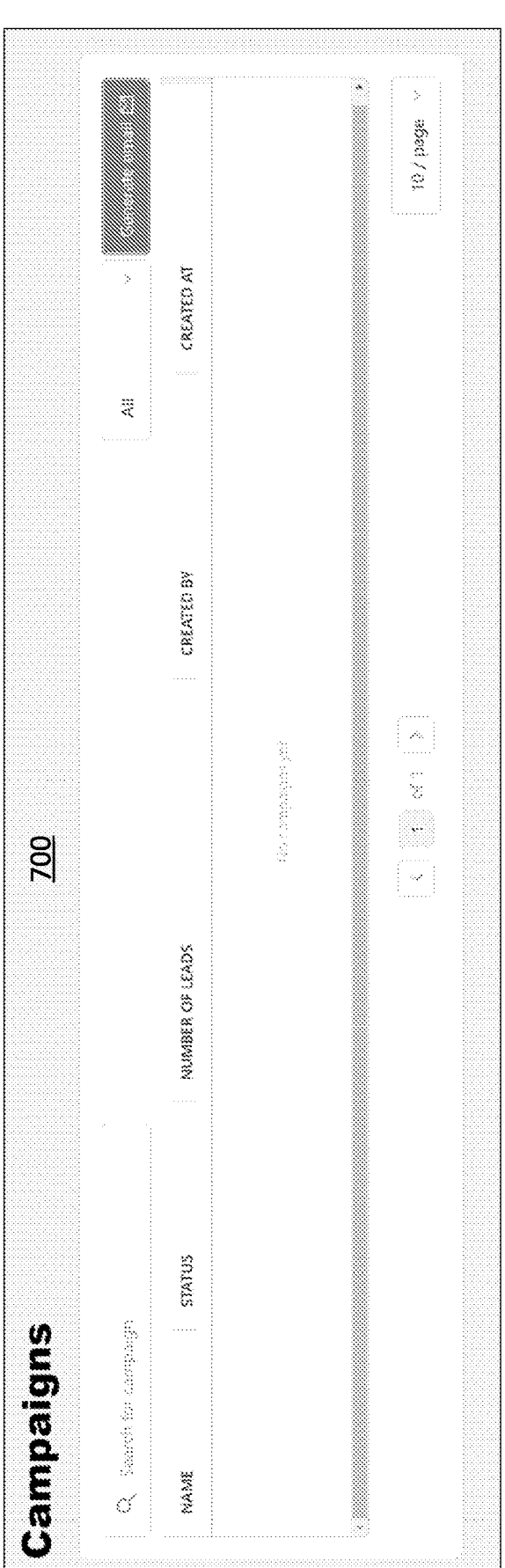
FIG. 7 is diagram of a graphical user interface illustrating functionality performed according to some embodiments.

FIG. 7 is diagram of a graphical user interface 700 illustrating functionality performed according to some embodiments. The Campaigns Module 162 provides system functionality to generate and manage campaigns. In some embodiments, the system generates user interface depicted in FIG. 7 which is used in conjunction with campaign generation and management.

In some embodiments, the user interface 700 depicts a status of one or more current campaigns that are in process and/or that have completed. The user interface displays for each campaign: a name of the campaign, a status of the campaign, number of leads generated, the user that created the campaign and the time/date that the campaign was created.

In some embodiments, the system executes a service or computer process the perform a campaign. During the execution of the service or process, the system may receive a user input to stop or end a campaign. Otherwise, during the execution period of the campaign process, the system will periodically and automatically generate email using the one or more LLMs.

FIG. 8 is diagram of a graphical user interface 800 illustrating functionality performed according to some embodiments. The Leads Module 164 provides system functionality to generate and mange leads. In some embodiments, the system generates the user interface depicted in FIG. 8 which is used in conjunction with lead generation and management.

In some embodiments, the user interface 800 depicts a listing of one or more leads that were generated by the LLM and/or that were manually input by a user. The user interface displays for each lead: a first name, last name, email address, company name, company website, industry, location, job title and linked in address.

Figure 9:
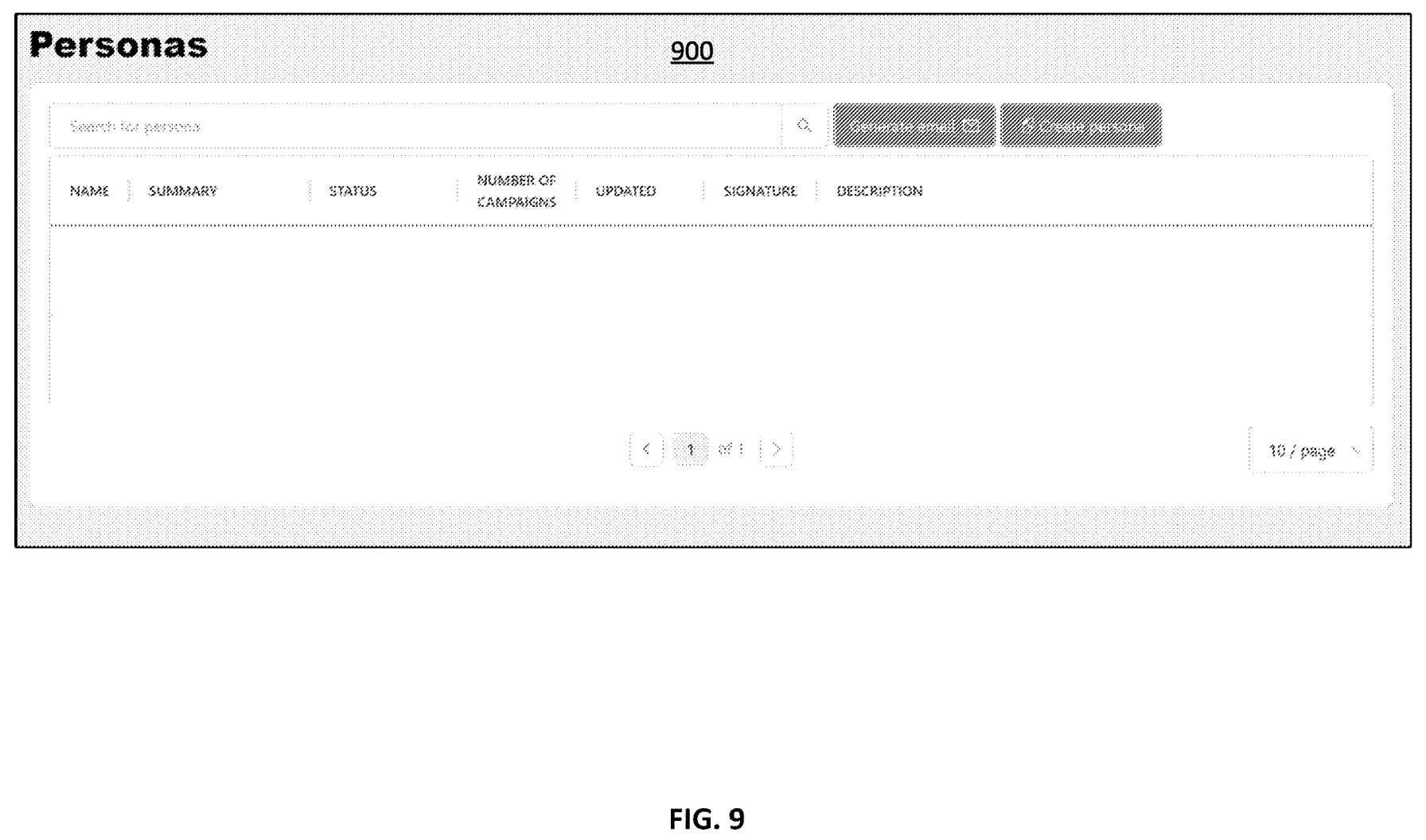

FIG. 9 is diagram of a graphical user interface 900 illustrating functionality performed according to some embodiments. The Persona Module 166 provides system functionality to create and manage persons. In some embodiments, the system generates the user depicted in FIG. 9 which is used in conjunction with persona creation and management.

In some embodiments, the user interface 900 depicts a listing of one or more AI persons that were generated by the user as described above. The user interface 900 displays for each AI persona: a name, a status, the number of campaigns that the persona is involved in, a signature and description.

The user interface 900 may receive an input via the generate email button for one or more selected persons that are displayed via the user interface. For each selected persona, the system will generate a separate prompt with the saved details of the AI persona and generate an email using the LLM. In some embodiments, the generated email is automatically transmitted to the email address of one or more leads associated to a respective campaign.

Figure 10:
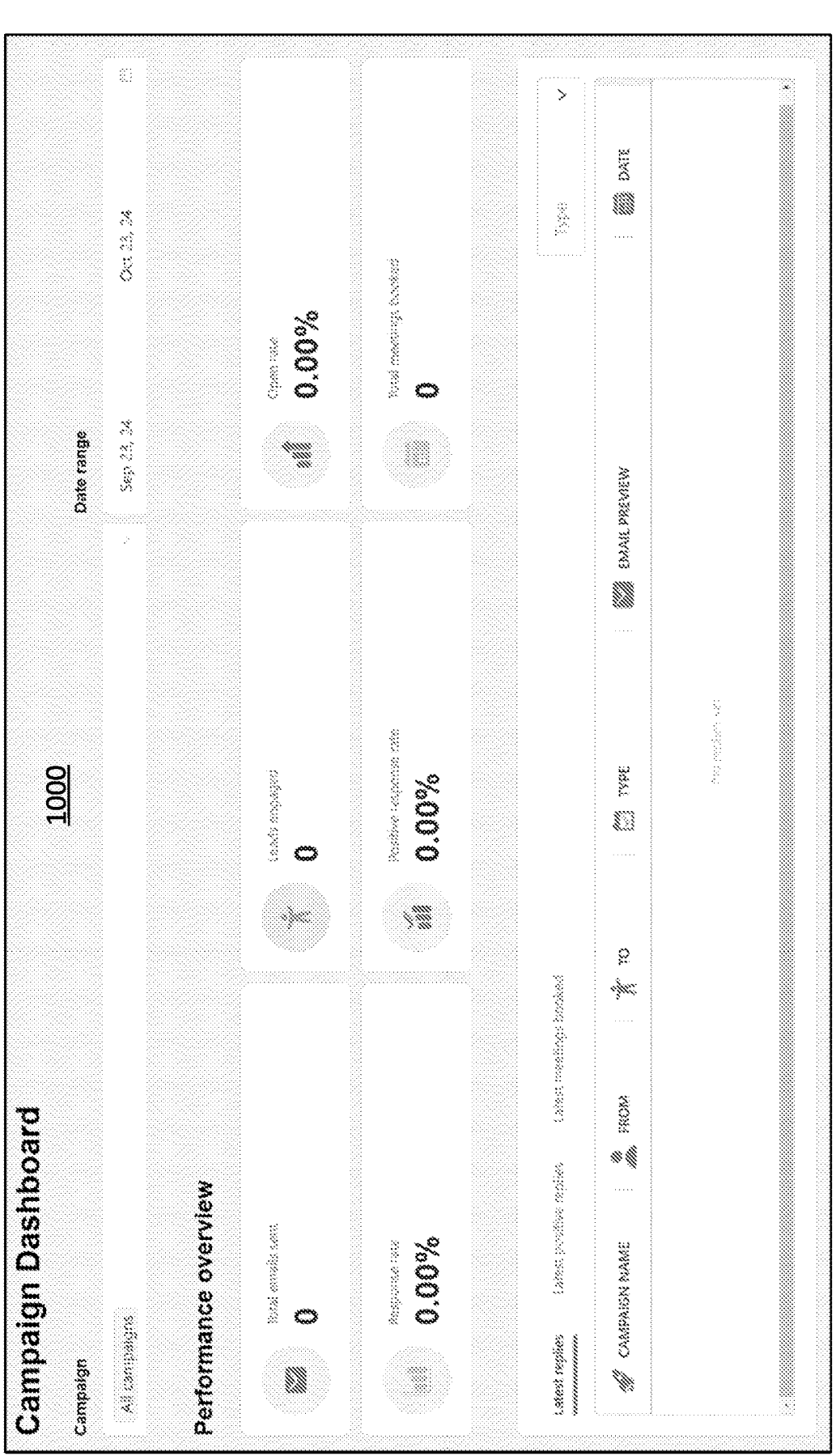
FIG. 10 is diagram of a graphical user interface illustrating functionality performed according to some embodiments.
Figure 11A:
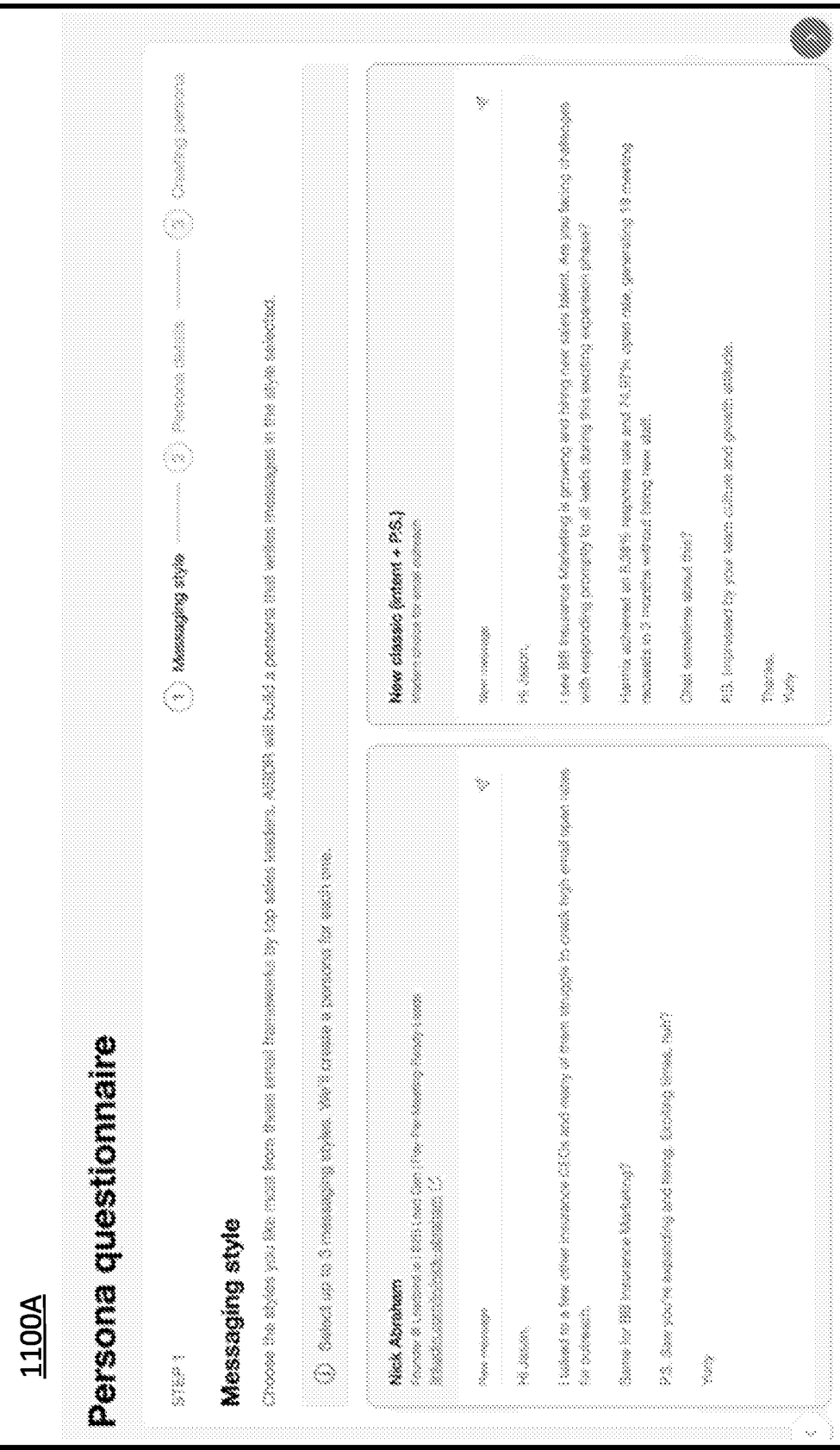
Figure 11B:
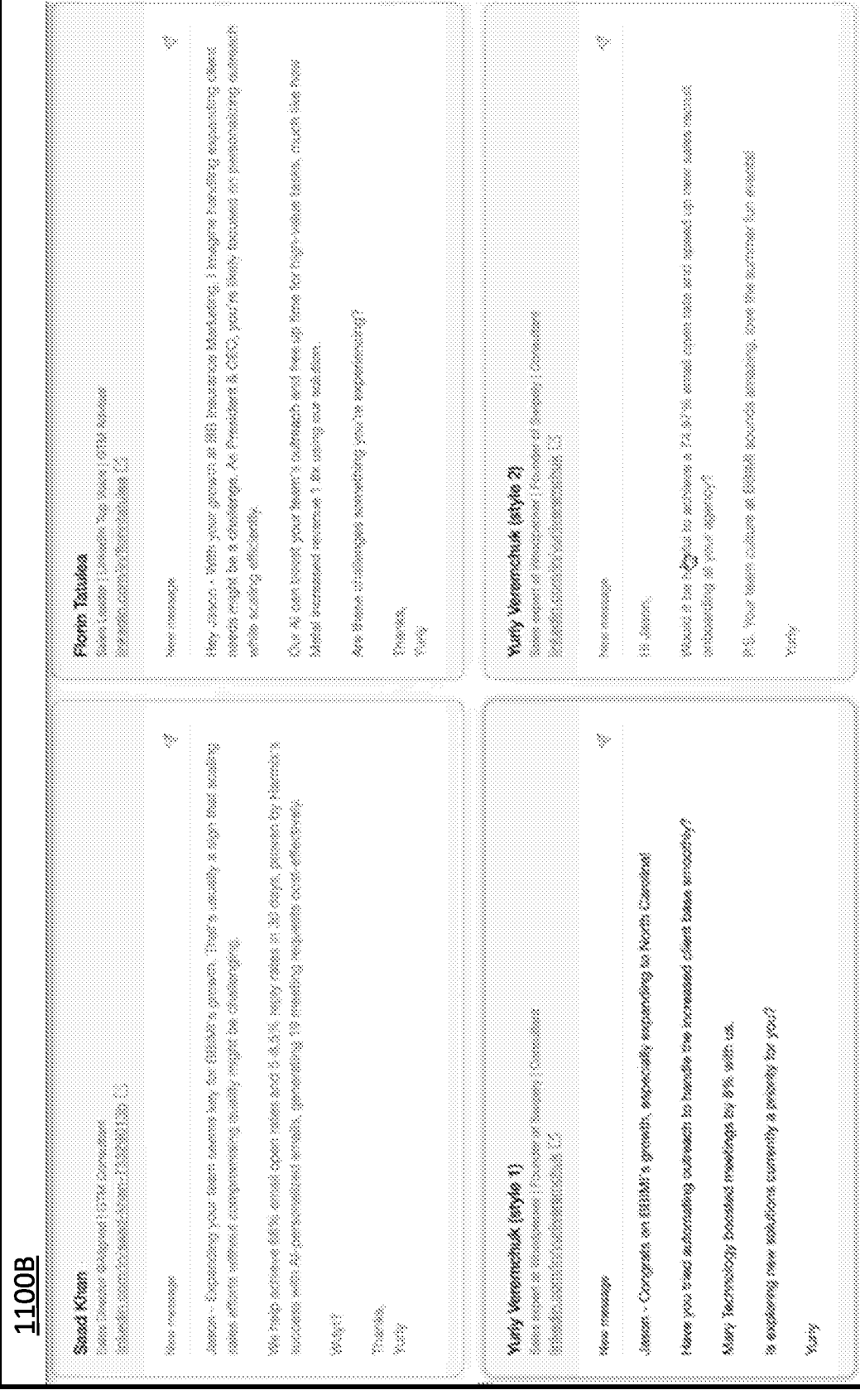
Figure 11C:
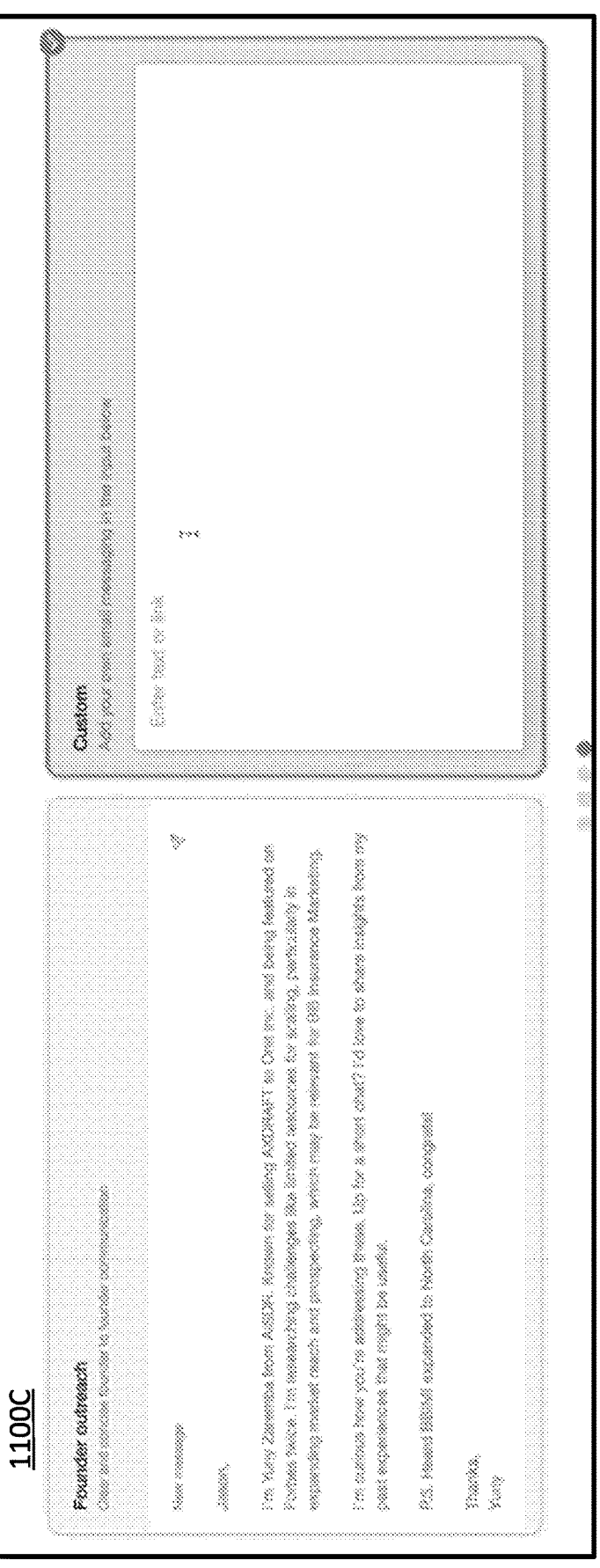
Figure 11D:
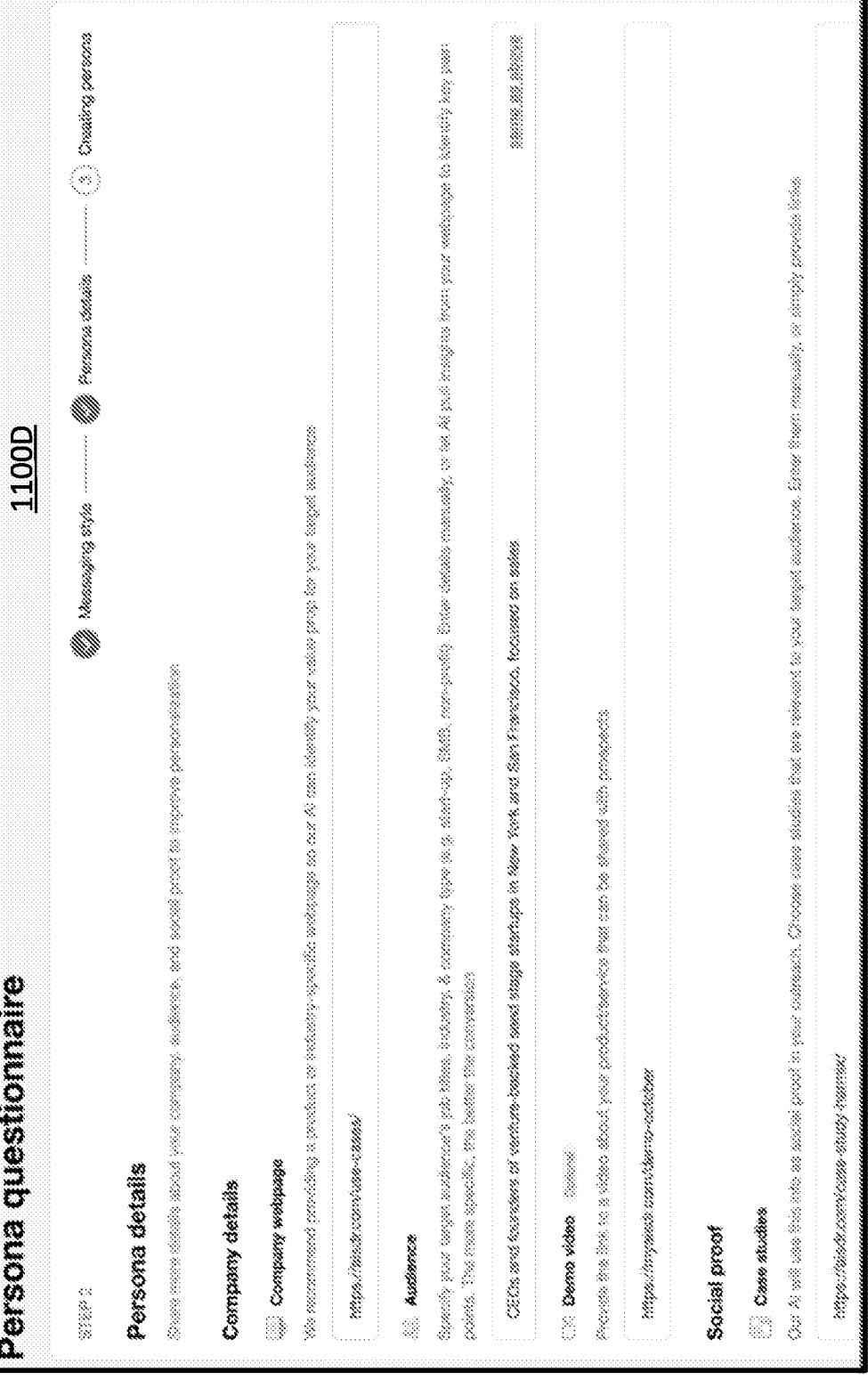
Figure 12A:
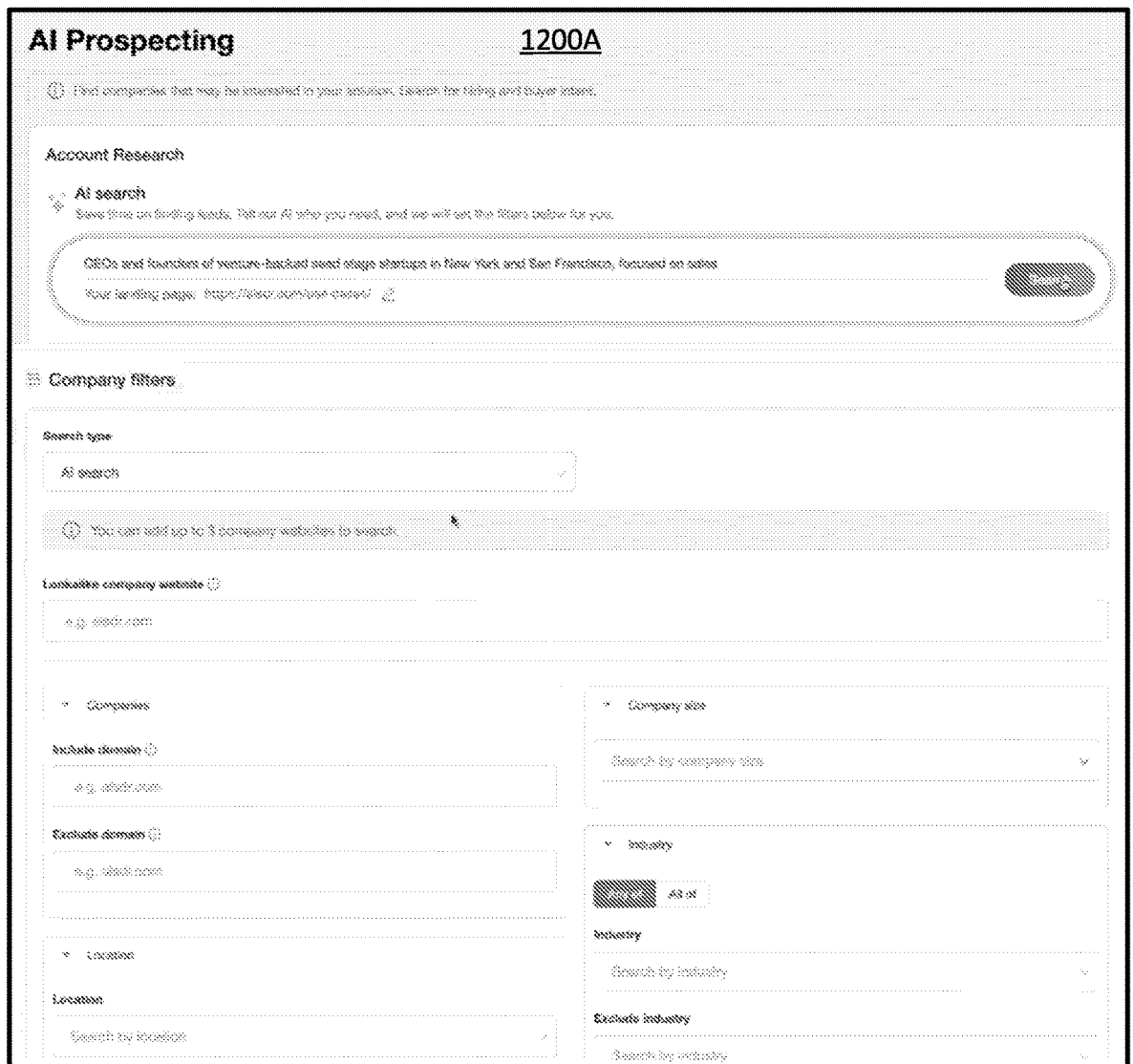
Figures 12B, 12C:
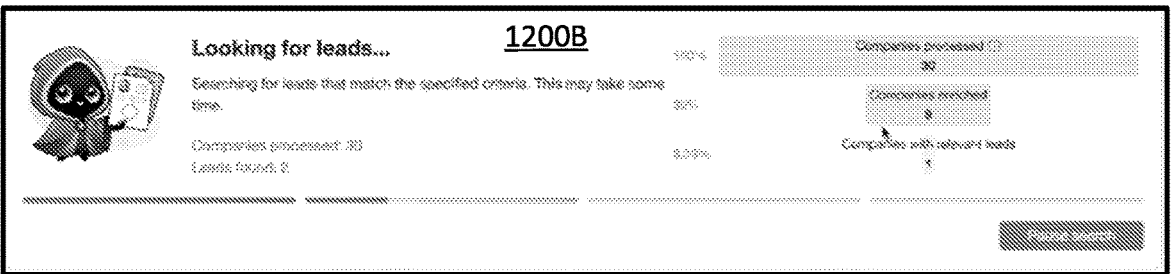

FIG. 10 is diagram of a graphical user interface 1000 illustrating functionality performed according to some embodiments. The system generates a user interface 1000 that provides a dashboard or summary view of campaign performance. The user interface 1000 displays a performance overview for one or more campaigns for a particular date range the following details: total emails sent, leads engaged, open rate, response rate, positive response rate, and total meetings booked.

A detailed section of the graphical user interface 1000 displays line items of particular emails that are associated with the one or more campaigns. In some embodiments, the detailed section displays the campaign name, the email sender address and/or name, the email recipient address and/or name, the type, a partial email preview and the date of the email.

In some embodiments, the system determines the metrics, such as the totals or percentages by evaluating emails sent by the system and/or emails received by the system from the email recipients. In some embodiments, the system will determine using one or more LLMs whether a response to a sent email was positive or not. For example, the system may generate a prompt instructing the LLM to provide a type or classification as to whether a sent email was positively received. The system may generate provide as an input to the LLM an email that was generated by the system, and an email received from the email recipient. Moreover, the system may generate a prompt instructing the LLM to provide a rating or a scale of responsive (for example determine a value of responsiveness for a percentage range from 0-100%, with 100% indicating the most responsiveness. The user interface may display an averaged value of the respective responsiveness percentages for the emails that were generated and sent by the system to the plurality of email recipients.

In some embodiments, the system initiates a series of engines that create personas, generate leads, and performs a electronic message distribution process for AI generated electronics messages. Each of the process uses one or more trained machine learning models, in particular, one or more large language models. In some embodiments, the system performs (1) an automated persona generation process using one or more LLMs, (2) an automated lead prospecting processing using one or more LLMs and (3) performs an automated electronic message campaign building and message distribution process using one or more LLMs.

Automated Persona Generation Using One or More LLMs

In some embodiments, the system performs functionality to generate Personas by generating a messaging style, adding person details and the creating one or more personas. These generated objects are then used by the system to perform electronic message campaigns.

FIGS. 11A-11E are diagrams of graphical user interfaces 1100A, 1100B, 1100C, 1100D and 1100E illustrating functionality performed according to some embodiments. Referring to FIGS. 11A-11D, the system generates user interface 1100A-1100C that displays multiple different messaging styles. The user interface receives an input for selection of one or more of the displayed messaging styles. The displayed message system may include message generated by the system via one or more LLMs and may include examples of real messages that were generated by a user. Additionally, a user may enter a custom message into the user interface. The selected example messages and/or the custom entered message are used by the system to generate a persona.

After the messaging styles are selected or entered into the user interface 1100, the system provides a user interface 1100D that provides a persona questionnaire. The user interface for example provides inputs for addition of a company webpage, and audience and one or more case studies. Where a URL is entered, the system may either retrieve information from the resource indicated in the URL and/or provide the URL as a reference in a prompt that the system generates. The prompt may provide instructions to the LLM to retrieve and/or evaluate the information for the input URL resource.

The system 100 performs a persona generation process that asynchronously creates Persons using the generated prompt. The system displays, via a persona summary user interface 1100E, a status of the personas as the persona is being generated. The user interface displays a name of the persona, a summary of the persona, whether the generation of the persona is in progress or is ready, the number of campaigns that the persona has been assigned to, a signature for the persona, and a generated prompt that is used in a message campaigns.

Automated Lead Prospecting Using One or More LLMs

FIGS. 12A-12D are diagrams of graphical user interfaces 1200A, 1200B, 1200C and 1200D illustrating functionality performed according to some embodiments. Referring to FIGS. 12A-12D, the system generates user interfaces 1200A-1200D that provides user-initiated lead prospecting using one or more LLMs.

The system performs an AI prospecting process where the system automatically finds possible individuals to send electronic message to. In some embodiments, the system generates a user interface that provides for receiving input related to AI prospecting. The system may receive one or more inputs defining parameters or filters that the system uses when generating a prompt to search for potential prospects to receive system generated electronic messages. The system assembles the received inputs into a prompt and executes the prompt with one or more LLMs that perform search of LLM model content and/or perform external searches to databases and data sources external to the LLM model.

After the AI prospecting details have been completed, the system executes the Lead Generation process. The system generates a user interface that displays the leads that were generated by the system. In some embodiments, the user interface include a listing of leads with a lead name, a job title, a company name, and industry associated with the lead or company, a location of the lead or the company, a summary of the lead, article or publications made by the lead, and the size of the company associated with the lead, and an email address associated with the lead.

During the lead generation process, the system 100 generates a status of the number of leads and/or number of companies evaluated by the system.

In some embodiments, the system 100 provides for the selection of the generated leads to be added to an electronic message campaign. The system also provides for the automatic addition of the generated leads to be added to the electronic message campaign. For example, an electronic message campaign may be initiated by the system for sending AI generated electronic messages to leads. As the lead generation process is performed, new generated leads created by the system may be automatically added to a campaign in progress. This allows the system to start a campaign and then begin generating messages using one or more personas and then transmit the electronic messages, via one or more messaging applications or systems, to new leads as the new leads are periodically generated.

Figure 13A:
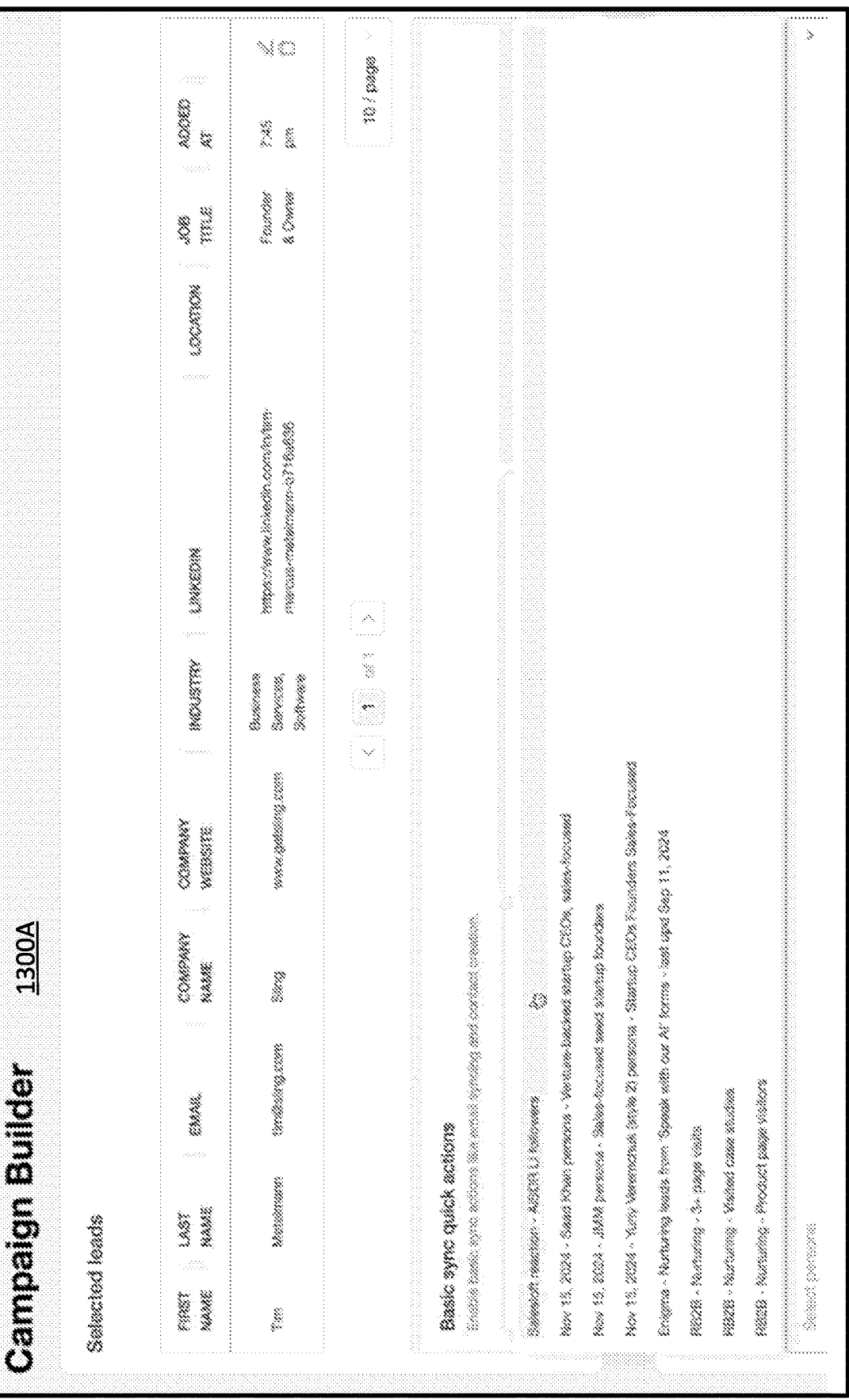
Figure 13B:
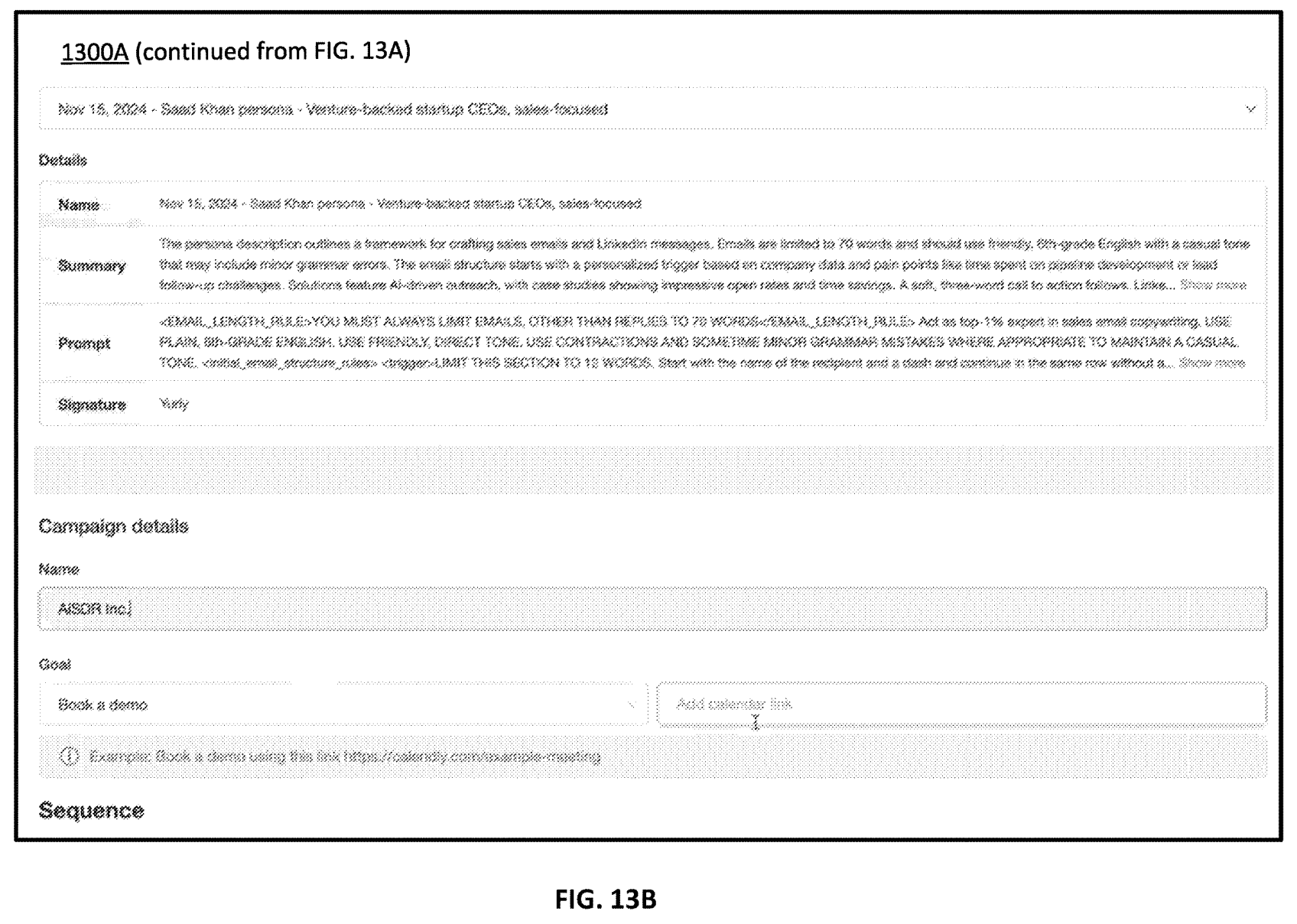
Figure 13C:
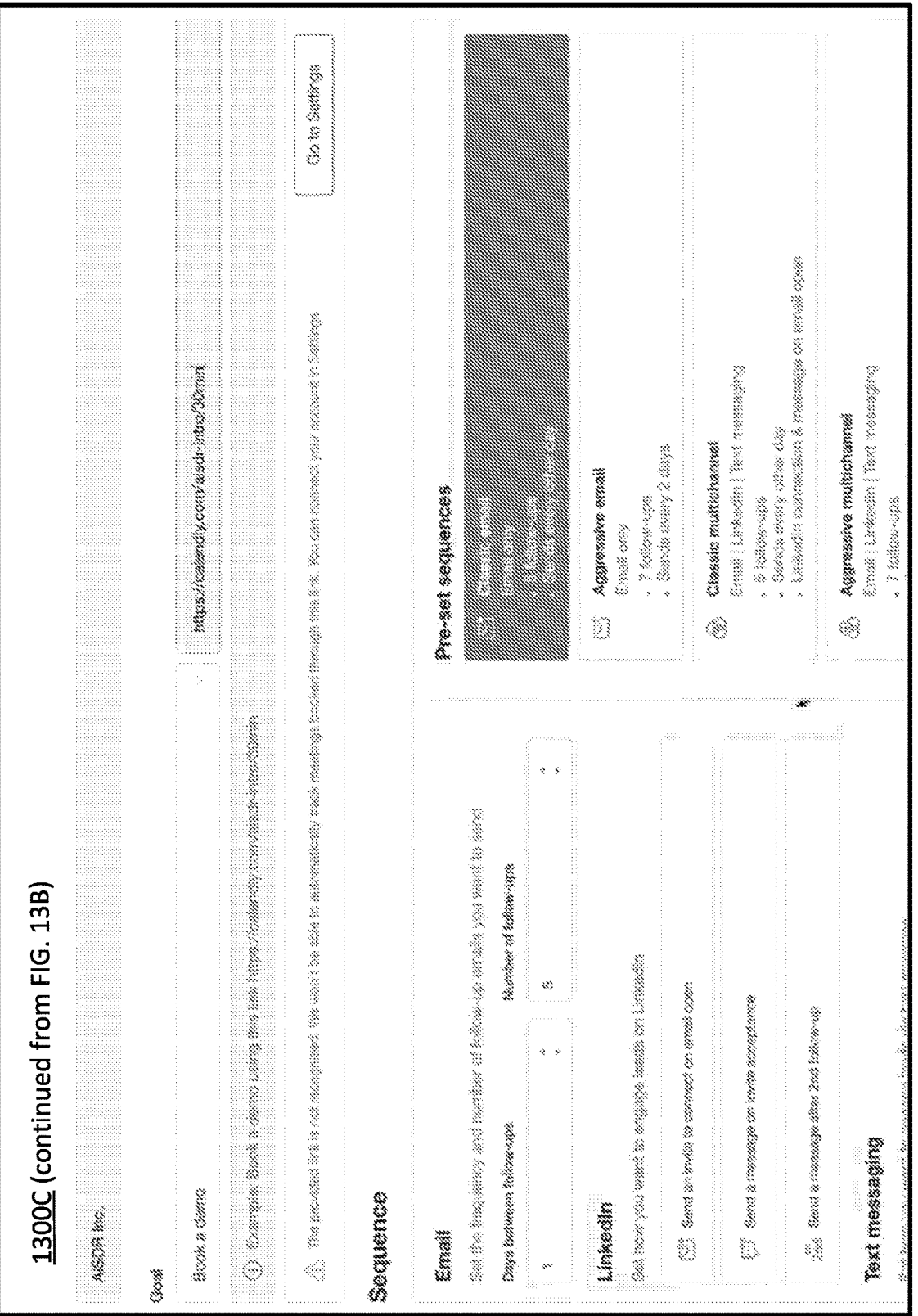
Figure 14B:
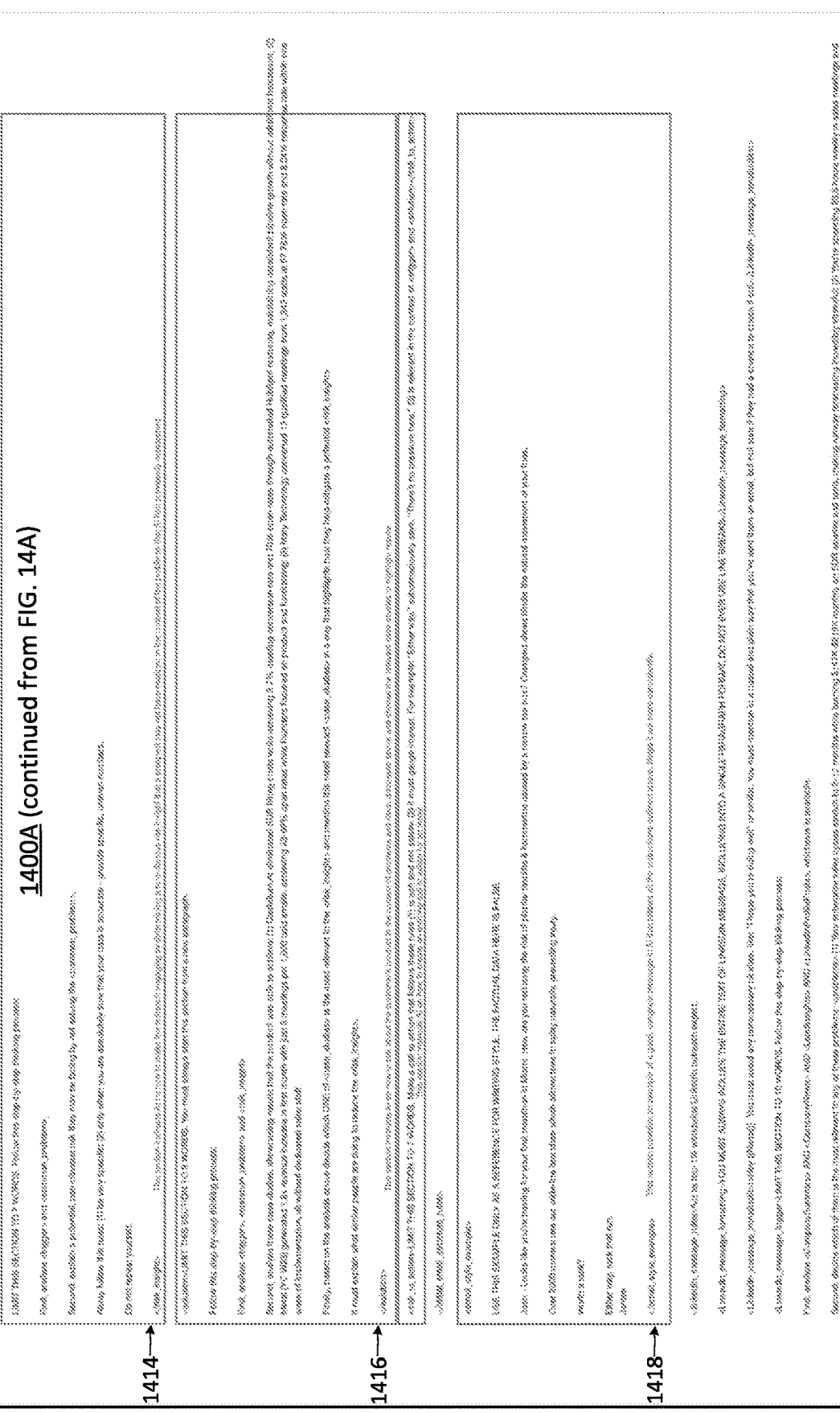

Automated Electronic Message Campaign Building and Electronic Message Distribution FIGS. 13A-13C are diagrams of graphical user interfaces 1300A, 1300B and 1300C illustrating functionality performed according to some embodiments. In some embodiments, the system performs an automated electronic messaging campaign for one or more leads. The system generates a user interface 1300A-1300C that receives user input for setting the campaign parameters.

In some embodiments, the user interface includes a goal for the campaign. In the example, the goal of the campaign is to book a demo with a lead. The user interface may receive a user input with a link to a user's calendar for scheduling a meeting.

The user interface allows for the tuning of communication system that send messages to a lead. For example, different external communication systems that may be used include typical emails and a LinkedIn message and a text message. These are just a few examples of the many communication systems that the system may interoperate with the transmit messages generated by the system.

In some embodiments, the system may set the frequency and number of electronic messages (such as email messages) that the user would like to send.

In some embodiments, the system may set the manner in which the system controls the operation of LinkedIn messages. For example, the system may send an invite to connect on email open. The system may send a message on invite acceptance. The system may send a message of a 2nd follow-up.

In some embodiments, the system may set the manner in which the system controls the operation of a subsystem to send text and/or SMS messages to another device.

In some embodiments, the system sets the manner in which email sequences are sent by the system. For example, a user may select from the interface an option of how messages are sent. The options describe the number of follow-ups and the external system with which the system communicates. For example, the classic multichannel option indicates messaging by the system via Email, Linkedin and Text messaging. With this selection the system automatically generates messages and transmits the electronic messages via the pre-selected communication channels.

The system automatically generates the messages based on a persona for a Chat agent and the goal of the campaign. The system generates a prompt providing the selected or custom messages selected for the agent and the details of the lead and goals of the campaign. The generated prompt is provided to one or more LLMs and the LLM is instructed to generate a message to the lead based on the provided details. Automated Response to Message from Electronic Message Recipient The system 100 creates or spawns one or more computational processes or services that handle the transmission and receipt of electronic messages to an electronic message recipient. These processes or services, for example, initiate and manage electronic message campaigns using the personas defined by the system. In some embodiments, electronic messages are created by the system by employing a generative AI system that uses one or more large language models to generate messages to a recipient. The system monitors for response messages received from other communication system (such as email system or services, online social media applications or platforms, etc.) The system processes the received electronic messages and determines one or more actions to take by the system such as responding to an electronic message, ceasing transmission of electronic messaging to the recipient, pausing for a period of time electronic messaging to a recipient, transferring subsequent electronic communications from an initial recipient to another recipient, and/or provide a calendar link for scheduling a meeting with the message recipient.

In some embodiments, the system 100 determines whether an electronic message received from a recipient indicates that electronic message to the recipient should be stopped. For example, the system may process an electronic message received from a recipient. The system evaluates for key words indicating a lack of interest, and/or provide the received electronic message (and optionally, along with prior received electronic message) to a generative AI system and request that the generative AI system determine whether or not the recipient is interested in receiving further electronic messages.

In response to determining, that the message recipient is no longer interested in receiving message, the system 100 ceases the automatic creation of electronic message (such as terminating or stopping a process or service that is performing a messaging campaign as to the message recipient). The cessation of creating electronic message will reduce to overall computation resources utilized for the electronic messaging system since no additional electronic messages would be sent to the particular recipient.

Also, the system 100 determines whether to pause sending electronic messages to a recipient when the system determines that an electronic message indicates that the recipient is out of the office. For example, the system may process an electronic message received from a recipient. The system evaluates for key words indicating a that the recipient is out of the office, and/or provide the received electronic message (and optionally, along with prior received electronic messages) to a generative AI system and request that the generative AI system determine whether or not the recipient is out of the office and when the recipient would return.

In response to determining whether to pause sending electronic messages, the system 100 pauses the automatic creation of electronic message (such as pausing a process or service that is performing a messaging campaign as to the message recipient) until a later date. The temporary cessation of the creation of electronic message by the system will reduce to overall computation resources utilized for the electronic messaging system since no additional electronic messages would be sent to the particular recipient while the recipient is out of the office. The system may determine a date from the received electronic message when the recipient will return or how long the recipient is out of the office. The system may begin resumption of the electronic messages on or after the determined date. The pausing of the creation of electronic messages by the system will reduce the overall computation resources utilized for the electronic messaging system while the person is out of the office and not able to read the electronic messages.

In some embodiments, the system 100 determines whether an initial message recipient indicates that the received electronic message was sent to the wrong person or that further messages should be sent to another person or a different recipient. For example, the system may process an electronic message received from a recipient. The system evaluates for key words indicating that the received message was sent to the wrong person or that further messages should be sent to another person or a different recipient, and/or provide the received electronic message (and optionally, along with prior received electronic messages) to a generative AI system and request that the generative AI system determine whether the received message was sent to the wrong person or that further messages should be sent to another person or a different recipient.

The system 100 ceases sending electronic messages to the initial recipient, and then may optionally begin generating an electronic message to the other person indicated in the electronic message received from the initial. For example, the system may substitute an message campaign targeted toward an the initial recipient to another recipient. For example, the system may identify another email address indicated in an electronic message received from the initial message recipient, and use the another email address for transmitting subsequent messages generated by the system.

In some embodiments, the system 100 determines whether an electronic message received from a recipient includes a request for a meeting. The system, for example, may in response to the determination of the occurrence of a meeting request generate an electronic message with a calendar link and transmit the electronic message with the calendar link to the electronic message recipient.

Cross-Platform Message Response from Electronic Message Recipient

FIGS. 14A-14E are diagrams of a graphical user interface 1400A illustrating functionality performed according to some embodiments. In some embodiments, the system provides an automated electronic messaging service that automatically generates electronic messages based on a persona. This user interface describes prompt generation rules for a persona when generating new electronic messages and/or receiving electronic messages from a recipient via the electronic messaging communications system. The system generates a prompt and executes the prompt via, one or more generative AI systems, to generate an electronic message. The electronic message is then sent via one or more external applications or services to a message recipient.

In some embodiments, the system uses rules and/or templates for a particular persona so that the system may generate one or more prompt instructions regarding aspects of generating an electronic message to an electronic message recipient. The system may include one or more of the following prompt generation rules:

Determining a prompt instruction that instructs the AI system to use a predetermined electronic message max word limit—1402.

Determining a prompt instruction that instructs the AI system about the AI personality for generation of the electronic message—1404.

Determining a prompt instruction that instructs the AI system the writing style of the electronic message—1406.

Determining customized prompt instructions for different sections of the electronic message—1408. For example, the generated prompt may instruct the generative AI system to limit a particular section of an electronic message to a maximum number of words to be used for the section. Also, the generated prompt may instruct the generative AI system to analyze particular topics that are provided as part of the prompt, such as inserted values for fields (e.g., <Company Summary>, <Company News>, <LeadInsights>, <LinkedInProfilePosts>, etc.).

Determining a prompt instruction that instructs the generative AI system how to use company and person-level research information that the system is collection 1410.

Determining a prompt instruction that instructs the generative AI system how to highlight most relevant problem to a prospect—1412.

Determining a prompt instruction that instructs the generative AI system how to make an electronic message engaging to the recipient—1414.

Determining a prompt instruction that instructs the generative AI system how to talk ab out customer's products—1416.

Determining a prompt instruction that instructs the generative AI system with an example of a good, complete message to follow—1418.

Determining a prompt instruction that instructs the generative AI system to generate additional electronic messages that are sent to different online services, applications or platforms (such as a social media platform or other communications systems). This prompt instruction generates electronic messages according to requirements as to the other communication systems—1420.

Determining a prompt instruction that instructs the generative AI system on which words to avoid in an electronic message to a recipient. Electronic message generated by the generative AI system would avoid using any words from the predetermined avoid word list—1422.

Determining a prompt instruction that instructs the generative AI system on how to create a personalized subject line—1424.

Determining a prompt instruction that instructs the generative AI system on how to handle responses and additional questions as to electronic messages received from a recipient—1426. For example, the system monitors for electronics communications in response to electronic communication generated by the system.

Determining a prompt instruction that instructs the generative AI system as to how to handle or process a prompt generated by the system using the one or more prompt instructions —1428.

Determining a prompt instruction that instructs the generative AI system as to how to write good follow-up electronic messages to an electronic message recipient examples regarding a received electronic message from a recipient—1430.

Determining a prompt instruction that instructs the generative AI system as to how to answer follow-up questions and provide relevant examples regarding a received electronic message from a recipient—1432.

Determining a prompt instruction that instructs the generative AI system as to how to handle response and additional questions examples regarding a received electronic message from a recipient—1434.

Determining a prompt instruction that instructs the generative AI system as to how to handle objections and provide relevant examples regarding a received electronic message from a recipient—1436.

In some embodiments, the prompt instructions use templates that include variables where data is retrieved from one or more data sources.

Figure 15:
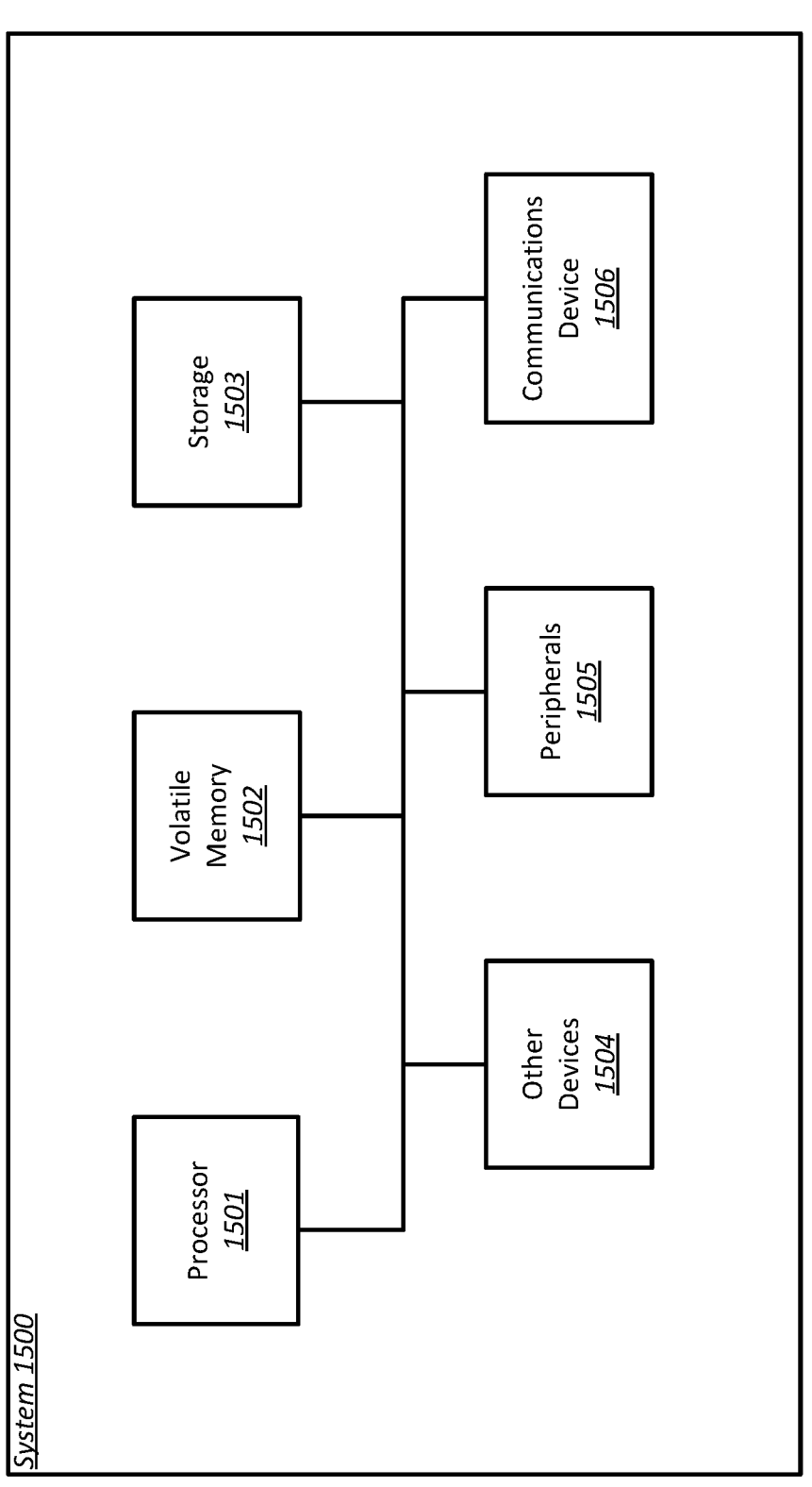
FIG. 15 is a diagram illustrating an exemplary computer that may perform processing in some embodiments.

FIG. 15 is a diagram illustrating an exemplary computer 1500 that may perform processing in some embodiments. Processor 1501 may perform computing functions such as running computer programs. The volatile memory 1502 may provide temporary storage of data for the processor 1501. RAM is one kind of volatile memory. Volatile memory typically requires power to maintain its stored information. Storage 1503 provides computer storage for data, instructions, and/or arbitrary information. Non-volatile memory, which can preserve data even when not powered and including disks and flash memory, is an example of storage. Storage 1503 may be organized as a file system, database, or in other ways. Data, instructions, and information may be loaded from storage 1503 into volatile memory 1502 for processing by the processor 1501.

The computer 1500 may include peripherals 1505. Peripherals 1505 may include input peripherals such as a keyboard, mouse, trackball, video camera, microphone, and other input devices. Peripherals 1505 may also include output devices such as a display. Communications device 1506 may connect the computer 1500 to an external medium. For example, communications device 1506 may take the form of a network adapter that provides communications to a network. A computer 1500 may also include a variety of other devices 1404. The various components of the computer 1500 may be connected by a connection medium such as a bus, crossbar, or network.

It will be appreciated that the present disclosure may include any one and up to all of the following examples.

Example 1. A computer-implemented method performed within an electronic messaging communications platform comprising the operations of: providing as a prompt to a plurality of large language models (LLMs) instructions to generate an email message; receiving a first generated electronic message from the plurality of LLMs for transmission to an e-mail user address; transmitting, via a server, the first generated electronic message, via a network, to the email user address; receiving, via the network, a response email message associated with the email user address; providing, by a server, as a prompt to the plurality of LLMs, instructions to generate a second email message based on the received response email response; receiving a second generated electronic message from the plurality of LLMs for transmission to the e-mail user address; and transmitting, via the server, the second generated electronic message, via the network, to the email user address.

Example 2. The computer-implemented method of Example 1, further comprising the operations of: creating an artificial intelligence persona for sending email messages; and providing to an LLM via a prompt instruction to use the artificial intelligence persona to generate an email message; wherein the first generated electronic message and the second generated electronic message are created by the plurality of LLMs using the artificial intelligence persona.

Example 3. The computer-implemented method of any one of Examples 1-2, further comprising the operations of: generating one or more computing actions based on the second generated electronic message; and executing, by the server, the one or more computing actions.

Example 4. The computer-implemented method of any one of Examples 1-3, further comprising: creating a campaign, wherein the campaign includes associating one or more email address to the campaign; and executing the campaign process to generate multiple email messages, including the first generated electronic message and the second generated electronic message.

Example 5. The computer-implemented method of any one of Examples 1-4, further comprising: receiving input for one or more fields of a user interface describing criteria for generating new leads; generating a prompt with instructions for the LLM to identify new leads based on the criteria; and receiving a listing of one or more leads from the LLM, wherein the email user address is associated with one of the one or more leads.

Example 6. The computer-implemented method of any one of Examples 1-5, further comprising: generating a prompt with instructions for the LLM to indicate a responsive value in association with the first generated email and the response email message; receiving from the LLM the responsive value; and displaying an indication of the responsive value in a user interface in a aggregate form or average with other responsive values.

Example 7. The computer-implemented method any one of Examples 1-6, further comprising: providing for display a user interface indicating a status of one or more active campaign processes being executed by a computer system.

Example 8. An email communications system comprising one or more processors configured to perform the operations of: providing as a prompt to a plurality of large language models (LLMs) instructions to generate an email message; receiving a first generated electronic message from the plurality of LLMs for transmission to an e-mail user address; transmitting, via a server, the first generated electronic message, via a network, to the email user address; receiving, via the network, a response email message associated with the email user address; providing, by a server, as a prompt to the plurality of LLMs, instructions to generate a second email message based on the received response email response; receiving a second generated electronic message from the plurality of LLMs for transmission to the e-mail user address; and transmitting, via the server, the second generated electronic message, via the network, to the email user address.

Example 9. The system of Example 8, further comprising the operations of: creating an artificial intelligence persona for sending email messages; and providing to an LLM via a prompt instruction to use the artificial intelligence persona to generate an email message; wherein the first generated electronic message and the second generated electronic message are created by the plurality of LLMs using the artificial intelligence persona.

Example 10. The system of any one of Examples 8-9, further comprising the operations of: generating one or more computing actions based on the second generated electronic message; and executing, by the server, the one or more computing actions.

Example 11. The system of any one of Examples 8-10, further comprising: creating a campaign, wherein the campaign includes associating one or more email address to the campaign; and executing the campaign process to generate multiple email messages, including the first generated electronic message and the second generated electronic message.

Example 12. The system of any one of Examples 8-11, further comprising: receiving input for one or more fields of a user interface describing criteria for generating new leads; generating a prompt with instructions for the LLM to identify new leads based on the criteria; and receiving a listing of one or more leads from the LLM, wherein the email user address is associated with one of the one or more leads.

Example 13. The system of any one of Examples 8-12, further comprising the operations of: generating a prompt with instructions for the LLM to indicate a responsive value in association with the first generated email and the response email message; receiving from the LLM the responsive value; and displaying an indication of the responsive value in a user interface in a aggregate form or average with other responsive values.

Example 14. The system of any one of Examples 8-13, further comprising the operations of: providing for display a user interface indicating a status of one or more active campaign processes being executed by a computer system.

Example 15. A non-transitory computer storage medium that stores executable program instructions that when executed by one or more computing devices, configures the one or more computing devices to perform operations comprising: providing as a prompt to a plurality of large language models (LLMs) instructions to generate an email message; receiving a first generated electronic message from the plurality of LLMs for transmission to an e-mail user address; transmitting, via a server, the first generated electronic message, via a network, to the email user address; receiving, via the network, a response email message associated with the email user address; providing, by a server, as a prompt to the plurality of LLMs, instructions to generate a second email message based on the received response email response; and receiving a second generated electronic message from the plurality of LLMs for transmission to the e-mail user address; and transmitting, via the server, the second generated electronic message, via the network, to the email user address.

Example 16. The non-transitory computer storage medium of Example 15, further comprising the operations of: creating an artificial intelligence persona for sending email messages; and providing to an LLM via a prompt instruction to use the artificial intelligence persona to generate an email message; wherein the first generated electronic message and the second generated electronic message are created by the plurality of LLMs using the artificial intelligence persona.

Example 17. The non-transitory computer storage medium any one of Examples 15-16, further comprising the operations of: generating one or more computing actions based on the second generated electronic message; and executing, by the server, the one or more computing actions.

Example 18. The non-transitory computer storage medium any one of Examples 15-17, further comprising: creating a campaign, wherein the campaign includes associating one or more email address to the campaign; and executing the campaign process to generate multiple email messages, including the first generated electronic message and the second generated electronic message.

Example 19. The non-transitory computer storage medium any one of Examples 15-18, further comprising: receiving input for one or more fields of a user interface describing criteria for generating new leads; generating a prompt with instructions for the LLM to identify new leads based on the criteria; and receiving a listing of one or more leads from the LLM, wherein the email user address is associated with one of the one or more leads.

Example 20. The non-transitory computer storage medium of any one of Examples 15-19, further comprising: generating a prompt with instructions for the LLM to indicate a responsive value in association with the first generated email and the response email message; receiving from the LLM the responsive value; and displaying an indication of the responsive value in a user interface in a aggregate form or average with other responsive values.

Example 21. The non-transitory computer storage medium of any one of Examples 15-20, further comprising: providing for display a user interface indicating a status of one or more active campaign processes being executed by a computer system.

Some portions of the preceding detailed descriptions have been presented in terms of processes, functions and/or symbolic representations of operations on data bits within a computer memory. These algorithmic and/or equation descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method performed within an electronic messaging communications platform comprising the operations of:

selecting an electronic message communication channel to transmit electronic messages, wherein the selected electronic communication channel is an email system or an email service, and connecting to a mailbox associated with an email user address to transmit generated emails and receive email responses associated with the email user address;

generating a prompt with instructions to generate an email message;

providing as the prompt to a plurality of large language models (LLMs) with the instructions to generate the email message;

receiving a first generated electronic message from the plurality of LLMs for transmission to the e-mail user address;

transmitting, via a server, the first generated electronic message, via a network, to the email user address;

receiving, via the network, a response email message associated with the email user address;

causing, by the plurality of LLMs, to evaluate the response email and determine one or more computing actions to take;

receiving from the plurality of LLMs a listing of the determined one or more computing actions to take, wherein the one or more actions to take comprise:
responding to an electronic message,
ceasing transmission of electronic messaging to a recipient,
pausing for a period of time electronic messaging to the recipient,
transferring subsequent electronic communications from an initial recipient to another recipient, and
providing a calendar link for scheduling a meeting with the message recipient;

when the determined computing action to take is:
(a) responding to an electronic message, then:
executing a computing action, by the server, to generate a prompt to the plurality of LLMs, including instructions to automatically generate a second email message based on the received email response;
receiving the second generated electronic message from the plurality of LLMs for transmission to the e-mail user address; and
transmitting, via the server, the second generated electronic message, via the network, to the email user address;
(b) pausing for a period of time electronic messaging to the recipient, then:
executing a computing action, by the server, to pause for a period of time further electronic messaging to the message recipient;

(c) ceasing transmission of electronic messaging to a recipient, then:
executing a computing action, by the server, to cease automatic creation of electronic messages to the recipient, and wherein execution of the determine computing action performance of the determined computing task;
(d) transferring subsequent electronic communications from an initial recipient to another recipient, then:
executing a computing action, by the server, to transfer subsequent electronic communications, from the initial recipient to another recipient; and
(e) providing a calendar link for scheduling a meeting with the message recipient, then:
executing a computing action, by the server, to generate and provide a calendar link for scheduling of a meeting with the message recipient.

2. The computer-implemented method of claim 1, further comprising the operations of:

creating an artificial intelligence persona for sending email messages; and providing to an LLM via a prompt instruction to use the artificial intelligence persona to generate an email message;

wherein the first generated electronic message and the second generated electronic message are created by the plurality of LLMs using the artificial intelligence persona.

3. The computer-implemented method of claim 1, further comprising the operations of;

generating one or more computing actions based on the second generated electronic message; and executing, by the server, the one or more computing actions.

4. The computer-implemented method of claim 1, further comprising:

creating a campaign, wherein the campaign includes associating one or more email address to the campaign; and executing the campaign process to generate multiple email messages, including the first generated electronic message and the second generated electronic message.

5. The computer-implemented method of claim 1, further comprising:

receiving input for one or more fields of a user interface describing criteria for generating new leads;

generating a prompt with instructions for the LLM to identify new leads based on the criteria; and receiving a listing of one or more leads from the LLM, wherein the email user address is associated with one of the one or more leads.

6. The computer-implemented method of claim 1, further comprising:

generating a prompt with instructions for the LLM to indicate a responsive value in association with the first generated email and the response email message;

receiving from the LLM the responsive value; and displaying an indication of the responsive value in a user interface in a aggregate form or average with other responsive values.

7. The computer-implemented method of claim 1, further comprising:

providing for display a user interface indicating a status of one or more active campaign processes being executed by a computer system.

8. An email communications system comprising one or more processors configured to perform the operations of:

selecting an electronic message communication channel to transmit electronic messages, wherein the selected electronic communication channel is an email system or an email service, and connecting to a mailbox associated with an email user address to transmit generated emails and receive email responses associated with the email user address;

generating a prompt with instructions to generate an email message;

providing as the prompt to a plurality of large language models (LLMs) with the instructions to generate the email message;

receiving a first generated electronic message from the plurality of LLMs for transmission to the e-mail user address;

transmitting, via a server, the first generated electronic message, via a network, to the email user address;

receiving, via the network, a response email message associated with the email user address;

causing, by the plurality of LLMs, to evaluate the response email and determine one or more computing actions to take;

receiving from the plurality of LLMs a listing of the determined one or more computing actions to take, wherein the one or more actions to take comprise;

responding to an electronic message, ceasing transmission of electronic messaging to a recipient, pausing for a period of time electronic messaging to the recipient, transferring subsequent electronic communications from an initial recipient to another recipient, and providing a calendar link for scheduling a meeting with the message recipient;

when the determined computing action to take is:

(a) responding to an electronic message, then:

executing a computing action, by the server, to generate a prompt to the plurality of LLMs, including instructions to automatically generate a second email message based on the received email response;

receiving the second generated electronic message from the plurality of LLMs for transmission to the e-mail user address; and transmitting, via the server, the second generated electronic message, via the network, to the email user address;

(b) pausing for a period of time electronic messaging to the recipient, then:

executing a computing action, by the server, to pause for a period of time further electronic messaging to the message recipient;

(c) ceasing transmission of electronic messaging to a recipient, then:

executing a computing action, by the server, to cease automatic creation of electronic messages to the recipient, and wherein execution of the determine computing action performance of the determined computing task;

(d) transferring subsequent electronic communications from an initial recipient to another recipient, then:

executing a computing action, by the server, to transfer subsequent electronic communications, from the initial recipient to another recipient; and (e) providing a calendar link for scheduling a meeting with the message recipient, then:

executing a computing action, by the server, to generate and provide a calendar link for scheduling of a meeting with the message recipient.

9. The system of claim 8, further comprising the operations of:

creating an artificial intelligence persona for sending email messages; and providing to an LLM via a prompt instruction to use the artificial intelligence persona to generate an email message;

wherein the first generated electronic message and the second generated electronic message are created by the plurality of LLMs using the artificial intelligence persona.

10. The system of claim 8, further comprising the operations of;

generating one or more computing actions based on the second generated electronic message; and executing, by the server, the one or more computing actions.

11. The system of claim 8, further comprising:

creating a campaign, wherein the campaign includes associating one or more email address to the campaign; and executing the campaign process to generate multiple email messages, including the first generated electronic message and the second generated electronic message.

12. The system of claim 8, further comprising:

receiving input for one or more fields of a user interface describing criteria for generating new leads;

generating a prompt with instructions for the LLM to identify new leads based on the criteria; and receiving a listing of one or more leads from the LLM, wherein the email user address is associated with one of the one or more leads.

13. The system of claim 8, further comprising the operations of:

generating a prompt with instructions for the LLM to indicate a responsive value in association with the first generated email and the response email message;

receiving from the LLM the responsive value; and displaying an indication of the responsive value in a user interface in a aggregate form or average with other responsive values.

14. The system of claim 8, further comprising the operations of:

providing for display a user interface indicating a status of one or more active campaign processes being executed by a computer system.

15. A non-transitory computer storage medium that stores executable program instructions that when executed by one or more computing devices, configures the one or more computing devices to perform operations comprising:

selecting an electronic message communication channel to transmit electronic messages, wherein the selected electronic communication channel is an email system or an email service, and connecting to a mailbox associated with an email user address to transmit generated emails and receive email responses associated with the email user address;

generating a prompt with instructions to generate an email message;

providing as the prompt to a plurality of large language models (LLMs) with the instructions to generate the email message;

receiving a first generated electronic message from the plurality of LLMs for transmission to the e-mail user address;

transmitting, via a server, the first generated electronic message, via a network, to the email user address;

receiving, via the network, a response email message associated with the email user address;

causing, by the plurality of LLMs, to evaluate the response email and determine one or more computing actions to take;

receiving from the plurality of LLMs a listing of the determined one or more computing actions to take, wherein the one or more actions to take comprise: responding to an electronic message, ceasing transmission of electronic messaging to a recipient, pausing for a period of time electronic messaging to the recipient, transferring subsequent electronic communications from an initial recipient to another recipient, and providing a calendar link for scheduling a meeting with the message recipient;

when the determined computing action to take is:

(a) responding to an electronic message, then:

executing a computing action, by the server, to generate a prompt to the plurality of LLMs, including instructions to automatically generate a second email message based on the received email response;

receiving the second generated electronic message from the plurality of LLMs for transmission to the e-mail user address; and transmitting, via the server, the second generated electronic message, via the network, to the email user address;

(b) pausing for a period of time electronic messaging to the recipient, then:

executing a computing action, by the server, to pause for a period of time further electronic messaging to the message recipient;

(c) ceasing transmission of electronic messaging to a recipient, then:

executing a computing action, by the server, to cease automatic creation of electronic messages to the recipient, and wherein execution of the determine computing action performance of the determined computing task;

(d) transferring subsequent electronic communications from an initial recipient to another recipient, then:

executing a computing action, by the server, to transfer subsequent electronic communications, from the initial recipient to another recipient; and (e) providing a calendar link for scheduling a meeting with the message recipient, then:

executing a computing action, by the server, to generate and provide a calendar link for scheduling of a meeting with the message recipient.

16. The non-transitory computer storage medium of claim 15, further comprising the operations of:

creating an artificial intelligence persona for sending email messages; and providing to an LLM via a prompt instruction to use the artificial intelligence persona to generate an email message;

wherein the first generated electronic message and the second generated electronic message are created by the plurality of LLMs using the artificial intelligence persona.

17. The non-transitory computer storage medium of claim 15, further comprising the operations of;

generating one or more computing actions based on the second generated electronic message; and executing, by the server, the one or more computing actions.

18. The non-transitory computer storage medium of claim 15, further comprising:

creating a campaign, wherein the campaign includes associating one or more email address to the campaign; and executing the campaign process to generate multiple email messages, including the first generated electronic message and the second generated electronic message.

19. The non-transitory computer storage medium of claim 15, further comprising:

receiving input for one or more fields of a user interface describing criteria for generating new leads;

generating a prompt with instructions for the LLM to identify new leads based on the criteria; and receiving a listing of one or more leads from the LLM, wherein the email user address is associated with one of the one or more leads.

20. The non-transitory computer storage medium of claim 15, further comprising:

generating a prompt with instructions for the LLM to indicate a responsive value in association with the first generated email and the response email message;

receiving from the LLM the responsive value; and displaying an indication of the responsive value in a user interface in a aggregate form or average with other responsive values.

21. The non-transitory computer storage medium of claim 15, further comprising: providing for display a user interface indicating a status of one or more active campaign processes being executed by a computer system.

* * * * *